US010002629B2

(12) United States Patent
Bennin et al.

(10) Patent No.: US 10,002,629 B2
(45) Date of Patent: Jun. 19, 2018

(54) DISK DRIVE SUSPENSION ASSEMBLY HAVING A PARTIALLY FLANGELESS LOAD POINT DIMPLE

(71) Applicant: Hutchinson Technology Incorporated, Hutchinson, MN (US)

(72) Inventors: Jeffry S. Bennin, Hutchinson, MN (US); Rick R. Drape, Hutchinson, MN (US); Thomas J. Glaeser, Hutchinson, MN (US); Corey S. Hartmann, Litchfield, MN (US); Haven A. Mercer, Excelsior, MN (US); Daniel P. Noga, Glencoe, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days. days.

(21) Appl. No.: 15/870,539

(22) Filed: Jan. 12, 2018

(65) Prior Publication Data

US 2018/0137884 A1 May 17, 2018

Related U.S. Application Data

(63) Continuation of application No. 15/383,348, filed on Dec. 19, 2016, now Pat. No. 9,870,792, which is a
(Continued)

(51) Int. Cl.
*G11B 5/48* (2006.01)
*G11B 5/00* (2006.01)

(52) U.S. Cl.
CPC .......... *G11B 5/4833* (2013.01); *G11B 5/4826* (2013.01); *G11B 5/48* (2013.01); *G11B 2005/0021* (2013.01)

(58) Field of Classification Search
CPC ... G11B 5/6005; G11B 5/4833; G11B 5/4826; G11B 5/48; G11B 21/21; G11B 21/16
See application file for complete search history.

(56) References Cited

U.S. PATENT DOCUMENTS 3,320,556 A 5/1967 Schneider
4,299,130 A 11/1981 Koneval
(Continued)

FOREIGN PATENT DOCUMENTS

EP 0591954 B1 4/1994
EP 0834867 B1 5/2007
(Continued)

OTHER PUBLICATIONS

International Search Report and Written Opinion issued in PCT/US2013/059702, dated Mar. 28, 2014, 9 pages.
(Continued)

*Primary Examiner* — Carlos E Garcia
(74) *Attorney, Agent, or Firm* — Nixon Peabody LLP

(57) ABSTRACT

Various embodiments concern a suspension assembly of a disk drive. The suspension assembly includes a load beam comprising a major planar area formed from a substrate. The load beam further comprises a window in the substrate, a dimple formed from the substrate, and a flange. The flange is a region of the major planar area that extends partially around the dimple but does not extend along an edge of the dimple. The edge of the dimple is adjacent to the window. The dimple is in contact with the flexure. A HAMR block or other element can extend through the window. The lack of a full flange can minimize the necessary clearance between the dimple and the HAMR block or other element and thereby allow the window to be enlarged to accommodate the HAMR block or other element.

18 Claims, 24 Drawing Sheets

Related U.S. Application Data continuation of application No. 14/760,426, filed as application No. PCT/US2014/046714 on Jul. 15, 2014, now Pat. No. 9,524,739.

(60) Provisional application No. 61/846,492, filed on Jul. 15, 2013.

(56) References Cited

U.S. PATENT DOCUMENTS

| | | | |
|---|---|---|---|
| 4,418,239 A | 11/1983 | Larson et al. | |
| 4,422,906 A | 12/1983 | Kobayashi | |
| 4,659,438 A | 4/1987 | Kuhn et al. | |
| 5,140,288 A | 8/1992 | Grunwell | |
| 5,320,272 A | 6/1994 | Melton et al. | |
| 5,321,568 A | 6/1994 | Hatam-Tabrizi | |
| 5,333,085 A | 7/1994 | Prentice et al. | |
| 5,427,848 A | 6/1995 | Baer et al. | |
| 5,459,921 A | 10/1995 | Hudson et al. | |
| 5,485,053 A | 1/1996 | Baz | |
| 5,491,597 A | 2/1996 | Bennin et al. | |
| 5,521,778 A | 5/1996 | Boutaghou et al. | |
| 5,526,208 A | 6/1996 | Hatch et al. | |
| 5,598,307 A | 1/1997 | Bennin | |
| 5,608,590 A | 3/1997 | Ziegler et al. | |
| 5,608,591 A | 3/1997 | Klaassen et al. | |
| 5,631,786 A | 5/1997 | Erpelding | |
| 5,636,089 A | 6/1997 | Jurgenson et al. | |
| 5,657,186 A | 8/1997 | Kudo et al. | |
| 5,657,188 A | 8/1997 | Jurgenson et al. | |
| 5,666,241 A | 9/1997 | Summers | |
| 5,666,717 A | 9/1997 | Matsumoto et al. | |
| 5,694,270 A | 12/1997 | Sone et al. | |
| 5,712,749 A | 1/1998 | Gustafson | |
| 5,717,547 A | 2/1998 | Young | |
| 5,734,526 A | 3/1998 | Symons | |
| 5,737,152 A | 4/1998 | Balakrishnan | |
| 5,754,368 A | 5/1998 | Shiraishi et al. | |
| 5,764,444 A | 6/1998 | Imamura et al. | |
| 5,773,889 A | 6/1998 | Love et al. | |
| 5,790,347 A | 8/1998 | Girard | |
| 5,796,552 A | 8/1998 | Akin, Jr. et al. | |
| 5,805,382 A | 9/1998 | Lee et al. | |
| 5,812,344 A | 9/1998 | Balakrishnan | |
| 5,818,662 A | 10/1998 | Shum | |
| 5,862,010 A | 1/1999 | Simmons et al. | |
| 5,862,015 A | 1/1999 | Evans et al. | |
| 5,889,137 A | 3/1999 | Hutchings et al. | |
| 5,892,637 A | 4/1999 | Brooks, Jr. et al. | |
| 5,898,544 A | 4/1999 | Krinke et al. | |
| 5,914,834 A | 6/1999 | Gustafson | |
| 5,921,131 A | 7/1999 | Stange | |
| 5,924,187 A | 7/1999 | Matz | |
| 5,929,390 A | 7/1999 | Naito et al. | |
| 5,973,882 A | 10/1999 | Tangren | |
| 5,973,884 A | 10/1999 | Hagen | |
| 5,986,853 A | 11/1999 | Simmons et al. | |
| 5,995,328 A | 11/1999 | Balakrishnan | |
| 6,011,671 A | 1/2000 | Masse et al. | |
| 6,038,102 A | 3/2000 | Balakrishnan et al. | |
| 6,046,887 A | 4/2000 | Uozumi et al. | |
| 6,055,132 A | 4/2000 | Arya et al. | |
| 6,075,676 A | 6/2000 | Hiraoka et al. | |
| 6,078,470 A | 6/2000 | Danielson et al. | |
| 6,108,175 A | 8/2000 | Hawwa et al. | |
| 6,115,221 A * | 9/2000 | Utsunomiya | G11B 5/4833 360/245.1 |
| 6,118,637 A | 9/2000 | Wright et al. | |
| 6,144,531 A * | 11/2000 | Sawai | G11B 5/4826 360/245.1 |
| 6,146,813 A | 11/2000 | Girard et al. | |
| 6,156,982 A | 12/2000 | Dawson | |
| 6,157,522 A | 12/2000 | Murphy et al. | |
| 6,172,853 B1 | 1/2001 | Davis et al. | |
| 6,181,520 B1 | 1/2001 | Fukuda | |
| 6,195,227 B1 | 2/2001 | Fan et al. | |
| 6,215,622 B1 | 4/2001 | Ruiz et al. | |
| 6,215,629 B1 | 4/2001 | Kant et al. | |
| 6,229,673 B1 | 5/2001 | Shinohara et al. | |
| 6,233,124 B1 | 5/2001 | Budde et al. | |
| 6,239,953 B1 | 5/2001 | Mei | |
| 6,246,546 B1 | 6/2001 | Tangren | |
| 6,246,552 B1 | 6/2001 | Soeno et al. | |
| 6,249,404 B1 | 6/2001 | Doundakov et al. | |
| 6,262,868 B1 | 7/2001 | Arya et al. | |
| 6,275,358 B1 | 8/2001 | Balakrishnan et al. | |
| 6,278,587 B1 | 8/2001 | Mei | |
| 6,282,062 B1 | 8/2001 | Shiraishi | |
| 6,295,185 B1 | 9/2001 | Stefansky | |
| 6,297,936 B1 | 10/2001 | Kant et al. | |
| 6,300,846 B1 | 10/2001 | Brunker | |
| 6,307,715 B1 | 10/2001 | Berding et al. | |
| 6,320,730 B1 | 11/2001 | Stefansky et al. | |
| 6,330,132 B1 | 12/2001 | Honda | |
| 6,349,017 B1 | 2/2002 | Schott | |
| 6,366,431 B1 * | 4/2002 | Tsuchiya | G11B 5/4826 360/245 |
| 6,376,964 B1 | 4/2002 | Young et al. | |
| 6,396,667 B1 | 5/2002 | Zhang et al. | |
| 6,399,899 B1 | 6/2002 | Ohkawa et al. | |
| 6,400,532 B1 | 6/2002 | Mei | |
| 6,404,594 B1 | 6/2002 | Maruyama et al. | |
| 6,424,500 B1 | 7/2002 | Coon et al. | |
| 6,445,546 B1 | 9/2002 | Coon | |
| 6,459,549 B1 | 10/2002 | Tsuchiya et al. | |
| 6,490,228 B2 | 12/2002 | Killam | |
| 6,493,190 B1 | 12/2002 | Coon | |
| 6,493,192 B2 | 12/2002 | Crane et al. | |
| 6,539,609 B2 | 4/2003 | Palmer et al. | |
| 6,549,376 B1 | 4/2003 | Scura et al. | |
| 6,549,736 B2 | 4/2003 | Miyabe et al. | |
| 6,563,676 B1 | 5/2003 | Chew et al. | |
| 6,596,184 B1 | 7/2003 | Shum et al. | |
| 6,597,541 B2 | 7/2003 | Nishida et al. | |
| 6,600,631 B1 | 7/2003 | Berding et al. | |
| 6,621,653 B1 | 9/2003 | Schirle | |
| 6,621,658 B1 | 9/2003 | Nashif | |
| 6,636,388 B2 | 10/2003 | Stefansky | |
| 6,639,761 B1 | 10/2003 | Boutaghou et al. | |
| 6,647,621 B1 | 11/2003 | Roen et al. | |
| 6,661,617 B1 | 12/2003 | Hipwell, Jr. et al. | |
| 6,661,618 B2 | 12/2003 | Fujiwara et al. | |
| 6,704,157 B2 | 3/2004 | Himes et al. | |
| 6,704,158 B2 | 3/2004 | Hawwa et al. | |
| 6,714,384 B2 | 3/2004 | Himes et al. | |
| 6,714,385 B1 | 3/2004 | Even et al. | |
| 6,724,580 B2 | 4/2004 | Irie et al. | |
| 6,728,057 B2 | 4/2004 | Putnam | |
| 6,728,077 B1 | 4/2004 | Murphy | |
| 6,731,472 B2 | 5/2004 | Okamoto et al. | |
| 6,735,052 B2 | 5/2004 | Dunn et al. | |
| 6,735,055 B1 | 5/2004 | Crane et al. | |
| 6,737,931 B2 | 5/2004 | Amparan et al. | |
| 6,738,225 B1 | 5/2004 | Summers et al. | |
| 6,741,424 B1 | 5/2004 | Danielson et al. | |
| 6,751,062 B2 | 6/2004 | Kasajima et al. | |
| 6,760,182 B2 | 7/2004 | Bement et al. | |
| 6,760,194 B2 | 7/2004 | Shiraishi et al. | |
| 6,760,196 B1 | 7/2004 | Niu et al. | |
| 6,762,913 B1 | 7/2004 | Even et al. | |
| 6,765,761 B2 | 7/2004 | Arya | |
| 6,771,466 B2 | 8/2004 | Kasajima et al. | |
| 6,771,467 B2 | 8/2004 | Kasajima et al. | |
| 6,791,802 B2 | 9/2004 | Watanabe et al. | |
| 6,796,018 B1 | 9/2004 | Thornton | |
| 6,798,597 B1 | 9/2004 | Aram et al. | |
| 6,801,402 B1 | 10/2004 | Subrahmanyam et al. | |
| 6,831,539 B1 | 12/2004 | Hipwell, Jr. et al. | |
| 6,833,978 B2 | 12/2004 | Shum et al. | |
| 6,839,204 B2 | 1/2005 | Shiraishi et al. | |
| 6,841,737 B2 | 1/2005 | Komatsubara et al. | |
| 6,856,075 B2 | 2/2005 | Houk et al. | |
| 6,898,042 B2 | 5/2005 | Subrahmanyan | |
| 6,900,967 B1 | 5/2005 | Coon et al. | |

(56) References Cited

U.S. PATENT DOCUMENTS

| | | |
|---|---|---|
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,283,331 B2 | 10/2007 | Oh et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,710,687 B1 | 5/2010 | Carlson et al. |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,813,083 B2 | 10/2010 | Guo et al. |
| 7,821,742 B1 | 10/2010 | Mei |
| 7,832,082 B1 | 11/2010 | Hentges et al. |
| 7,835,113 B1 * | 11/2010 | Douglas ............... G11B 5/4826 360/245.1 |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B2 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando et al. |
| 8,151,440 B2 | 4/2012 | Tsutsumi et al. |
| 8,154,827 B2 | 4/2012 | Contreras et al. |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,289,656 B1 | 10/2012 | Huber |
| 8,295,012 B1 | 10/2012 | Tian et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,405,933 B2 | 3/2013 | Soga |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B2 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 8,681,456 B1 | 3/2014 | Miller et al. |
| 8,717,712 B1 | 5/2014 | Bennin et al. |
| 8,792,214 B1 | 7/2014 | Bjorstrom et al. |
| 8,891,206 B2 | 11/2014 | Miller |
| 8,896,969 B1 | 11/2014 | Miller et al. |
| 8,896,970 B1 | 11/2014 | Miller et al. |
| 9,007,726 B2 | 4/2015 | Bennin et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0012194 A1 | 1/2002 | Inagaki et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0176209 A1 | 11/2002 | Schulz et al. |
| 2003/0011118 A1 | 1/2003 | Kasajima |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |

(56) References Cited

U.S. PATENT DOCUMENTS

| | | |
|---|---|---|
| 2003/0210499 A1 | 11/2003 | Arya |
| 2004/0008449 A1* | 1/2004 | Girard .................. G11B 5/4826 360/245.7 |
| 2004/0027727 A1 | 2/2004 | Shimizu et al. |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0024928 A1* | 1/2008 | Yang .................. G11B 5/4826 360/245.1 |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0190263 A1 | 7/2009 | Miura et al. |
| 2009/0244786 A1 | 10/2009 | Hatch |
| 2009/0294740 A1 | 12/2009 | Kurtz et al. |
| 2010/0007993 A1 | 1/2010 | Contreras et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195251 A1 | 8/2010 | Nojima et al. |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1 | 3/2011 | Fujimoto et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0099226 A1 | 4/2012 | Zambri et al. |
| 2012/0113547 A1 | 5/2012 | Sugimoto |
| 2012/0279757 A1 | 11/2012 | Ishii et al. |
| 2012/0281316 A1 | 11/2012 | Fujimoto et al. |
| 2013/0020112 A1 | 1/2013 | Ohsawa |
| 2013/0021698 A1 | 1/2013 | Greminger et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0265674 A1 | 10/2013 | Fanslau |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0098440 A1 | 4/2014 | Miller et al. |
| 2014/0168821 A1 | 6/2014 | Miller |
| 2014/0362475 A1 | 12/2014 | Bjorstrom et al. |
| 2014/0362476 A1 | 12/2014 | Miller et al. |
| 2015/0016235 A1 | 1/2015 | Bennin et al. |
| 2015/0055254 A1 | 2/2015 | Bjorstrom et al. |
| 2015/0055256 A1 | 2/2015 | Miller |
| 2015/0062758 A1 | 3/2015 | Miller et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| WO | WO1998020485 A1 | 5/1998 |
| WO | WO2014190001 A1 | 11/2014 |
| WO | 2015009733 A1 | 1/2015 |
| WO | 2015027034 A2 | 2/2015 |

OTHER PUBLICATIONS

"Calculating VLSI Wiring Capacitance", Jun. 1990, IBM Technical Disclosure Bulletin, vol. 33, Issue No. 1A, 2 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Plezoelectric Polymer Microactuator", a thesis submitted to Industrial Research Institute Swinburne (IRIS), Swinburne University of Technology, Hawthorn, Victoria, Australia, Dec. 2005.

Harris, N.R. et al., "A Multilayer Thick-film PZT Actuator for MEMs Applications", Sensors and Actuators A: Physical, vol. 132, No. 1, Nov. 8, 2006, pp. 311-316.

International Preliminary Report on Patentability issued in PCT/US2013/052885, dated Mar. 3, 2015, 10 pages.

International Preliminary Report on Patentability issued in PCT/US2013/059702, dated Mar. 17, 2015, 6 pages.

International Search Report and Written Opinion issued in PCT/US13/75320, dated May 20, 2014, 10 pages.

International Search Report and Written Opinion issued in PCT/U52013/031484, dated May 30, 2013, 13 pages.

International Search Report and Written Opinion issued in PCT/US2013/052885, dated Feb. 7, 2014, 13 pages.

International Search Report and Written Opinion issued in PCT/US2013/052885, dated Feb. 7, 2014, 16 pages.

(56) References Cited

OTHER PUBLICATIONS

International Search Report and Written Opinion issued in PCT/US2013/064314, dated Apr. 18, 2014, 10 pages.
International Search Report and Written Opinion issued PCT/US2013/046714, dated Jul. 15, 2014, 26 pages.
International Search Report and Written Opinion issued in PCT/US2014/052042, dated Mar. 13, 2015, 10 pages.
Jing, Yang, "Fabrication of piezoelectric ceramic Ferroelectrics and its reliability for hard disk drives", Ultrasonics, Ferroelectrics and Frequency Control, IEEE, vol. 51, No. 11, Nov. 2004, pp. 1470-1476 (abstract only).
Kon, Stanley et al., "Piezoresistive and Piezoelectric MEMs Strain Sensors for Vibration Detection", Sensors and Smart Structures Technologies for Civil, Mechanical, and Aerospace Systems 2007, Proc. of SPIE vol. 6529.
Lengert, David et al., "Design of suspension-based and collocated dual stage actuated suspensions", Microsyst Technol (2012) 18:1615-1622.
Li, Longqiu et al., "An experimental study of the dimple-gimbal interface in a hard disk drive", Microsyst Technol (2011) 17:863-868.
Pichonat, Tristan et al., "Recent developments in MEMs-based miniature fuel cells", Microsyst Technol (2007) 13:1671-1678.
Pozar, David M. Microwave Engineering, 4th Edition, copyright 2012 by John Wiley & Sons, Inc., pp. 422-426
Raeymaekers, B. et al., "Investigation of fretting wear at the dimple/gimbal interface in a hard disk drive suspension", Wear, vol. 268, Issues 11-12, May 12, 2010, pp. 1347-1353.
Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.
Rajagopal, Indira et al., "Gold Plating of Critical Components for Space Applications: Challenges and Solutions", Gold Bull., 1992, 25(2), pp. 55-66.
U.S. Appl. No. 13/365,443 to Miller, Mark A., entitled Elongated Trace Tethers for Disk Drive Head Suspension Flexures, filed Feb. 3, 2012.
U.S. Appl. No. 13/690,883 to Tobias, Kyle T. et al., entitled Microstructure Patterned Surfaces For Integrated Lead Head Suspensions, filed Nov. 30, 2012.
U.S. Appl. No. 13/827,622 to Bjorstrom, Jacob D. et al., entitled Mid-Loadbeam Dual Stage Actuated (DSA) Disk Drive Head Suspension, filed Mar. 14, 2013.
U.S. Appl. No. 14/056,481 entitled Two-Motor Co-Located Gimbal-Based Dual Stage Actuation Disk Drive Suspensions With Motor Stiffeners, filed Oct. 17, 2013.
U.S. Appl. No. 14/103,955 to Bjorstrom, Jacob D. et al., entitled Electrical Contacts To Motors In Dual Stage Actuated Suspensions, filed Dec. 12, 2013.
U.S. Appl. No. 14/141,617 to Bennin, Jeffry S. et al., entitled Disk Drive Suspension Assembly Having a Partially Flangeless Load Point Dimple, filed Dec. 27, 2013, 53 pages.
U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.
U.S. Appl. No. 14/216,288 to Miller, Mark A. et al., entitled Co-Located Gimbal-Based Dual Stage Actuation Disk Drive Suspension, filed Mar. 17, 2014, 84 pages.
U.S. Appl. No. 61/396,239 entitled Low Resistance Ground Joints For Dual Stage Actuation Disk Drive Suspensions, filed May 24, 2010, 16 pages.
U.S. Appl. No. 13/972,137 filed Aug. 21, 2013.
U.S. Appl. No. 14/026,427 filed Sep. 13, 2013.
U.S. Appl. No. 14/050,660 filed Oct. 10, 2013.
U.S. Appl. No. 14/216,288 filed Sep. 14, 2012.
U.S. Appl. No. 14/467,582 filed Oct. 10, 2012.
U.S. Appl. No. 13/955,204 to Bjorstrorn, Jacob D. et al., entitled Damped Dual Stage Actuation Disk Drive Suspensions, filed Jul. 31, 2013.
U.S. Appl. No. 13/955,204, to Bjorstrom, Jacob D. et al., Non-Final Office Action dated Mar. 24, 2014, 7 pages.
U.S. Appl. No. 13/955,204, to Bjorstrom, Jacob D. et al., Non-Final Office Action dated Oct. 29, 2013, 9 pages.
U.S. Appl. No. 13/955,204, to Bjorstrom, Jacob D. et al., Notice of Allowance dated Jan. 7, 2014, 6 pages.
U.S. Appl. No. 13/955,204, to Bjorstrom, Jacob D. et al., Notice of Allowance dated May 6, 2014, 5 pages.
U.S. Appl No. 13/955,204, to Bjorstrom, Jacob D. et al., Reponse filed Apr. 18, 2014 to Non-Final Office Action dated Mar. 24, 2014, 9 pages.
U.S. Appl. No. 13/955,204, to Bjorstrorn, Jacob D. et al., Response filed Nov. 19, 2013 to Non-Final Office Action dated Oct. 29, 2013, 11 pages.
U.S. Appl. No. 13/972,137 to Bjorstrorn, Jacob D. et al., entitled Co-Located Gimbal-Based Dual Stage Actuation Disk Drive Suspensions With Offset Motors, filed Aug. 21, 2013.
U.S. Appl. No. 13/972,137, to Bjorstrom, Jacob D. et al., Non-Final Office Action dated Nov. 5, 2013.
U.S. Appl. No. 13/972,137, to Bjorstrom, Jacob D. et al., Notice of Allowance dated Jan. 17, 2014, 5 pages.
U.S. Appl. No. 13/972,137, to Bjorstrom, Jacob D. et al., Response filed Dec. 2, 2013 to Non-Final Office Action dated Nov. 5, 2013, 12 pages.
U.S. Appl. No. 14/026,427 to Miller, Mark A., entitled Co-Located Gimbal-Based Dual Stage Actuation Disk Drive Suspensions, filed Sep. 13, 2013.
U.S. Appl. No. 14/044,238 to Miller, Mark A., entitled Co-Located Gimbal-Based Dual Stage Actuation Disk Drive Suspensions With Motor Stifeners, filed Oct. 2, 2013.
U.S. Appl. No. 14/044,238 to Miller, Mark A., Non-Final Office Action dated Feb. 6, 2014, 9 pages.
U.S. Appl. No, 14/044,238, to Miller, Mark A., Response filed Apr. 22, 2014 to Non-Final Office Action dated Feb. 6, 2014, 11 pages.
U.S. Appl. No. 14/050,660 to Miller, Mark A. et al., entitled Co-Located Gimbal-Based Dual Stage Actuation Disk Drive Suspensions With Dampers, filed Oct. 10, 2013.
U.S. Appl. No. 14/050,660, to Miller, Mark A. et al., Non-Final Office Action dated Mar. 31, 2014, 9 pages.
U.S. Appl. No. 14/146,760 to Roen, Michael E. entitled Balanced Multi-Trace Transmission in a Hard Disk Drive Flexure, filed Jan. 3, 2014, 32 pages.
U.S. Appl. No. 14/215,663 to Bjorstrom, Jacob D., entitled Co-Located Gimbal-Based Dual Stage Actuation Disk Drive Suspensions With Offset Motors, filed Mar. 17, 2014.
U.S. Appl. No. 14/270,070 to Bennin, Jeffry S. et al., entitled Disk Drive Suspension Assembly Having a Partially Flangeless Load Point Dimple, filed May 5, 2014.
U.S. Appl. No. 14/335,967 to Bjorstrom, Jacob D. et al., entitled Electrical Contacts To Motors In Dual Stage Actuated Suspensions, filed Jul. 21, 2014.
U.S. Appl. No. 14/467,543 to Bjorstrom, Jacob D. et al., entitled Damped Dual Stage Actuation Disk Drive Suspensions, filed Aug. 25, 2014.
U.S. Appl. No. 14/467,582 to Miller, Mark A. et al., entitled Co-Located Gimbal-Based Dual Stage Actuation Disk Drive Suspensions With Dampers, filed Aug. 25, 2014.
Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.

* cited by examiner

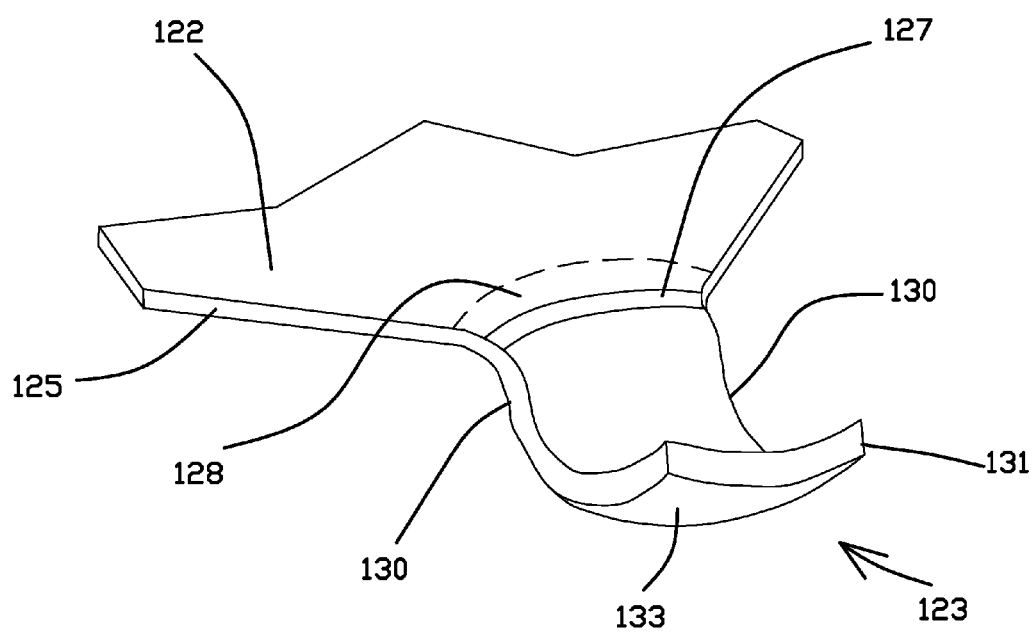

DISK DRIVE SUSPENSION ASSEMBLY HAVING A PARTIALLY FLANGELESS LOAD POINT DIMPLE

CROSS-REFERENCE TO RELATED APPLICATION

This application is a continuation of U.S. patent application Ser. No. 15/383,348, filed Dec. 19, 2016, entitled DISK DRIVE SUSPENSION ASSEMBLY HAVING A PARTIALLY FLANGELESS LOAD POINT DIMPLE, which is a continuation of U.S. patent application Ser. No. 14/760,426, filed Jul. 10, 2015, entitled, DISK DRIVE SUSPENSION ASSEMBLY HAVING A PARTIALLY FLANGELESS LOAD POINT DIMPLE, which is a U.S. National Stage entry of PCT/US2014/046714, filed Jul. 15, 2014, entitled, DISK DRIVE SUSPENSION ASSEMBLY HAVING A PARTIALLY FLANGELESS LOAD POINT DIMPLE, which claims the benefit of U.S. Provisional Application 61/846,492, filed Jul. 15, 2013, entitled, DISK DRIVE SUSPENSION ASSEMBLY HAVING A PARTIALLY FLANGELESS LOAD POINT DIMPLE, all of which are incorporated herein by reference in their entireties for all purposes.

TECHNICAL FIELD

The present disclosure relates generally to a head suspension assembly of a disk drive. In particular, the present invention concerns a load point element having a partial flange.

BACKGROUND OF THE INVENTION

Disk drives operate by reading and/or writing data to sections of one or more spinning disks housed within the disk drive. One or more transducers can be moved along each spinning disk to allow the one or more transducers to interface with different areas of the disks in a rapid manner. The one or more transducers are held over the disk by a head suspension assembly. The one or more transducers typically write to, and read from, the disk media magnetically. The one or more transducers are supported on the head suspension by a slider. The proximity of the slider to the surface of the disk, and the movement of air generated by the spinning of the disk, causes the slider to "fly" over the disk surface on an air bearing. The slider is suspended by a spring mechanism and is gimbaled to pitch and roll as needed while flying over the surface of the disk.

There is a constant need in the art to increase the quantity of data that can be stored in a disk drive. However, increasing the density of stored data further limits the disk area dedicated to storing each bit, which eventually meets the superparamagnetic limit of the disk media. One emerging technology for increasing the performance of disk drives is energy-assisted magnetic recording (EAMR). EAMR uses various types of energy to selectively change the coercivity of the disk media. Various types of EAMR exist, such as heat-assisted magnetic recording (HAMR) and microwave assisted magnetic recording (MAMR). HAMR technology, for example, allows the use of disk media that has higher magnetic stability and is therefore less likely to be corrupted at normal temperatures. The higher magnetic stability allows data to be dedicated to smaller cells on the disk media to increase the storage density. A focused light, such as a laser, near-field optical source, or other rapid heating source, is used to selectively heat small sections of the surface of the disk to temporarily lower the coercivity of the disk media just prior to writing. After being written to, the small portions of the disk cool to a more magnetically stable state.

HAMR technology, however, requires a laser or other rapid heating component to be deployed in proximity to the read/write transducer on the head suspension. Other types of EAMR likewise require an element that selectively changes the coercivity of the disk media to be mounted on the head suspension. This places further demands on the high performance components of the head suspension. Various embodiments of the present disclosure concern head suspension configurations that can accommodate EAMR and/or other components on a head suspension.

SUMMARY OF THE INVENTION

Various embodiments concern a suspension assembly of a disk drive. The suspension comprises one or more transducers configured to one or both of write to the media and read from the media and a flexure, the one or more transducers supported by the flexure. The suspension assembly further includes a load beam, the load beam comprising a major planar area formed from a substrate, the load beam further comprising a void in the substrate, a dimple formed from the substrate, and a flange. The flange is a region of the major planar area that extends partially around the dimple but does not extend along an edge of the dimple. The dimple and the void are positioned on the load beam such that the edge of the dimple is adjacent to the void and the dimple is in contact with the flexure and is configured to transfer a force to the flexure while allowing the flexure to move relative to the load beam. The dimple can comprise a spherical indentation and a transition section that is between the spherical indentation and the major planar area, the transition section at least partially surrounding the spherical indentation. In some embodiments, the transition section is at least partially truncated by the void along the edge of the dimple. In some further embodiments, the spherical indentation is at least partially truncated by the void along the edge of the dimple. In some embodiments, one or both of the transition section and the spherical indentation project into the void. The void can be a window. A HAMR block or other element can extend through the window. The lack of a full flange can minimize the necessary clearance between the dimple and the HAMR block or other element and thereby allow the window to be enlarged to accommodate the HAMR block or other element.

Various embodiments concern methods of making a suspension assembly. Such methods can include forming a load beam from a substrate, the load beam comprising a major planar area. Such methods can further include forming a void and a dimple in the substrate of the load beam. The dimple can be formed to have a flange, the flange comprising a region of the major planar area that extends partially around the dimple but does not extend along an edge of the dimple. The dimple can be formed on the load beam such that the edge of the dimple is adjacent to the void.

Various embodiments concern a suspension assembly of a disk drive comprising a load beam and a flexure mounted as a cantilever along the load beam. Either of the flexure or load beam comprises a dimple, a flange that extends partially around the dimple but does not extend along an edge of the dimple, and a void that is adjacent to the edge of the dimple. The other of the flexure or the load beam comprises a surface with which the dimple is engaged to transfer a force between the load beam and the flexure while allowing movement between the flexure and the load beam.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive. While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

BRIEF DESCRIPTION OF THE DRAWINGS

FIG. 12B is a perspective view of the partially flangeless dimple of FIG. 12A.

DETAILED DESCRIPTION OF THE INVENTION

Figure 1:
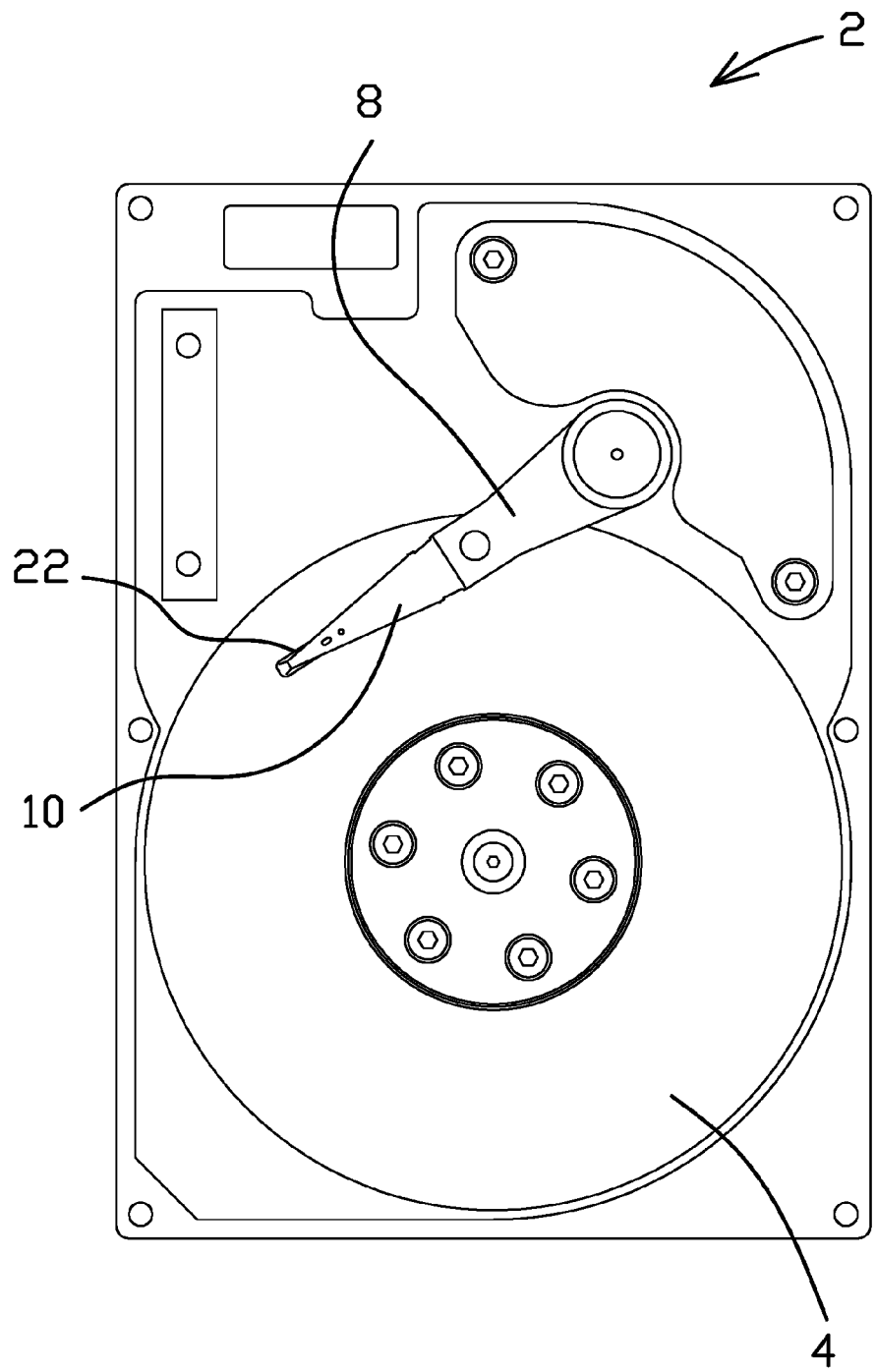
FIG. 1 is a top planar view of a disk drive having a head suspension assembly positioned over a magnetic disk.

FIG. 1 shows a plan view of a disk drive 2 having a head suspension 10 suspended over a disk 4. The head suspension 10 supports a slider 22 over the disk 4. The head suspension 10 is attached at its proximal end to an actuator arm 8, which is coupled to an actuator motor 6 mounted within the disk drive 2. The actuator motor 6 positions the actuator arm 8, head suspension 10, and slider 22 over a desired position on the disk 4. In the embodiment shown, the actuator motor 6 is rotary in nature, and operates to radially position the head suspension 10 and slider 22 over the disk 4. Other actuator motors, such as a linear actuator motor, can alternatively be used.

In use, the slider 22 reads from and/or writes to the disk 4 while the head suspension 10 supports and aligns the slider 22 over a desired location on the disk 4 in response to signals received from a microprocessor (not shown). The disk 4 rapidly spins about an axis, and an air bearing is created by the flow of air generated by the rapidly rotating disk 4. The slider 22 is aerodynamically designed to "fly" on the air bearing between the surface of the disk 4 and the slider 22. The air bearing urges the slider 22 away from the surface of the disk 4. The head suspension 10 provides a gram load spring force that counteracts the force of the air bearing and urges the slider 22 toward the surface of the disk 4. The separation distance at which these two forces are balanced during operation is known as the "fly height" of the slider 22. The specific positional orientation of slider 22 provided by head suspension 10 at the fly height in relation to the surface of the disk 4 is commonly referred to as the "dynamic attitude" of the slider 22.

Figure 2:
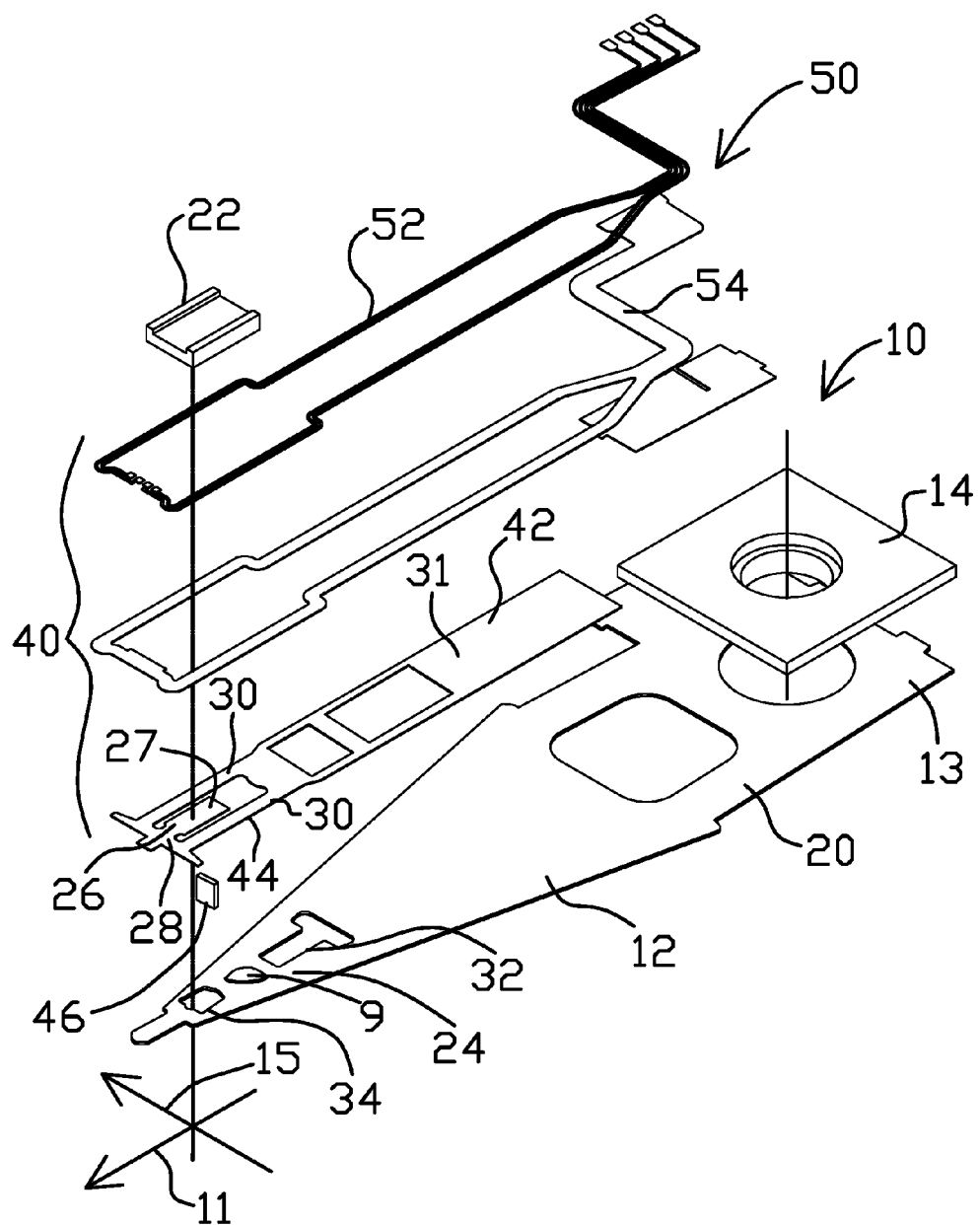
FIG. 2 is an exploded view of a head suspension assembly.

As shown in greater detail in FIG. 2, the head suspension 10 is comprised of a plurality of separate components that are mounted together. Head suspension 10 includes a load beam 12 to which a flexure 40 is mounted. The load beam 12 is a generally planar structure formed from a metal substrate, such as stainless steel. The load beam 12 includes a major planar area (e.g., a top or bottom surface of the load beam 12) that is flat and extends over a large portion of the load beam 12. The load beam 12 is generally rigid such that the different sections of the major planar area do not move relative to one another during normal operation of the head suspension 10. The major planar area is interrupted by various features, such as the proximal window 32 and the distal window 34. Other windows are shown in the load beam 12. The windows are open on a first side (e.g., the top side) and a second side (e.g., the bottom side) of the load beam 12 by extending through the substrate of the load beam 12. The windows can be used for alignment during assembly, the windows can lighten and/or strengthen the load beam 12, and/or other components can extend through one or more of the windows, as further discussed herein.

The load beam 12 includes a mounting region 13 at its proximal end, to which a base plate 14 is mounted. The mounting region 13 and base plate 14 are mounted to the actuator arm 8 of disk drive 2 in a known manner. The load beam 12 further includes a rigid region 24 at the distal portion of the load beam 12 and a spring region 20 located proximal of the rigid region 24 and distal of the mounting region 13. A flexure 40 (discussed more fully below) is mounted to the rigid region 24 of the load beam 12 and provides a resilient connection between the load beam 12 and slider 22.

The spring region 20 of load beam 12 provides a desired gram load that opposes the force exerted upon the slider 22 by the air bearing generated by the rotating disk 4. Toward this end, the spring region 20 can include a preformed bend or radius that provides a precise gram load force. The gram load is transmitted to the flexure 40 through the rigid region 24 of the load beam 12. A dimple 9 extends between the rigid region 24 of the load beam 12 and the flexure 40 to provide a point of transfer for the gram load.

The flexure 40 provides a resilient connection between the slider 22 and the load beam 12, and is designed to permit the slider 22 to gimbal in response to variations in the air bearing generated by the rotating disk 4. That is, minute variations in the surface of the disk 4 will create fluctuations in the air bearing generated by the rotating disk 4. These fluctuations in the air bearing will cause the slider 22 to roll about a longitudinal axis 11 (e.g., X-axis) of the head suspension 10, and to pitch about a transverse axis 15 (e.g., Y-axis). The flexure 40 is designed to permit the slider 22 to gimbal in both pitch and roll directions in response to these air bearing variations. The dimple 9 provides a point about which the slider 22, attached to the flexure 40 in a cantilevered manner, can gimbal in response to fluctuations in the air bearing to allow the slider 22 to pitch and roll relative to the load beam 12. Specifically, the spring arms 30 allow the tongue or cantilever beam 26 of the flexure 40 to gimbal in pitch and roll movements to accommodate surface variations in the disk 4 over which the slider 22 flies.

In the embodiment shown, the flexure 40 is separately formed from the load beam 12 such that the head suspension 10 is a three-piece design comprising the base plate 14, the load beam 12, and the flexure 40. The flexure 40 includes a mounting region 42 that overlaps and is mounted to the rigid region 24 of the load beam 12 using spot welds or other attachment techniques. The flexure 40 also includes a gimbal region 44 that can extend beyond the distal end of the load beam 12 and that can provide the resilient compliances that permits the slider 22 to gimbal. The gimbal region 44 comprises a pair of longitudinally extending spring arms 30 that are connected at the distal end of the spring arms 30 by a cross piece 28. The longitudinally extending spring arms 30 and the cross piece 28 define a gap between the spring arms 30 into which a tongue or cantilever beam 26 proximally extends from cross piece 28. The tongue or cantilever beam 26 includes a slider mounting surface 27 to which the slider 22 is mounted using known techniques such as adhesive. The tongue or cantilever beam 26 and spring arms 30 are sufficiently resilient to pitch about axis 15 and to torsionally rotate about axis 11 to permit pitch and roll motion of the slider 22 as needed during operation of the disk drive 2.

The flexure 40 also includes a trace assembly 50 that provides electrical interconnection between the slider 22 and a microprocessor (not shown) of the disk drive 2 to convey read and write signals to and from transducers mounted on the slider 22. The trace assembly 50 of the shown embodiment is comprised of a conductive layer 52 formed into longitudinal traces that extend along the length of the flexure 40 and an insulating layer 54 interposed between the spring metal layer 31 and the conductive layer 52. The trace assembly 50 can alternatively be formed separately from the rest of the flexure 40 and then mounted to the rest of the flexure 40 in a known method, such as with the use of adhesive. The trace assembly 50 can be routed across the flexure in any number of desired patterns as dictated by a specific application. In the embodiment shown in FIG. 2, the trace assembly 50 at the gimbal region 44 of the flexure 40 is adjacent to, and spaced apart from, the spring arms 30 of the flexure 40. During normal operation of the disk drive 2, the slider 22 assumes an orientation over the surface of the rotating disk 4 (the dynamic attitude) at a specific separation distance (e.g., 0.01 micrometers) from the surface of the disk 4.

Figure 3:
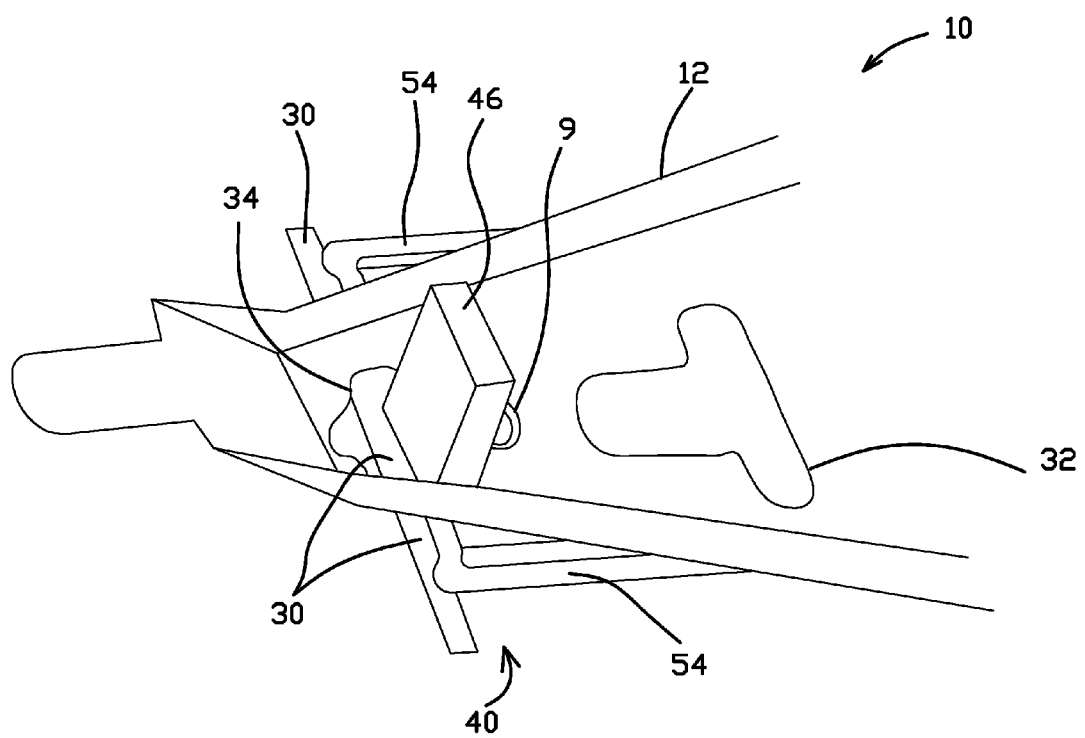
FIG. 3 is a perspective view of a distal portion of a head suspension assembly.
Figure 4:
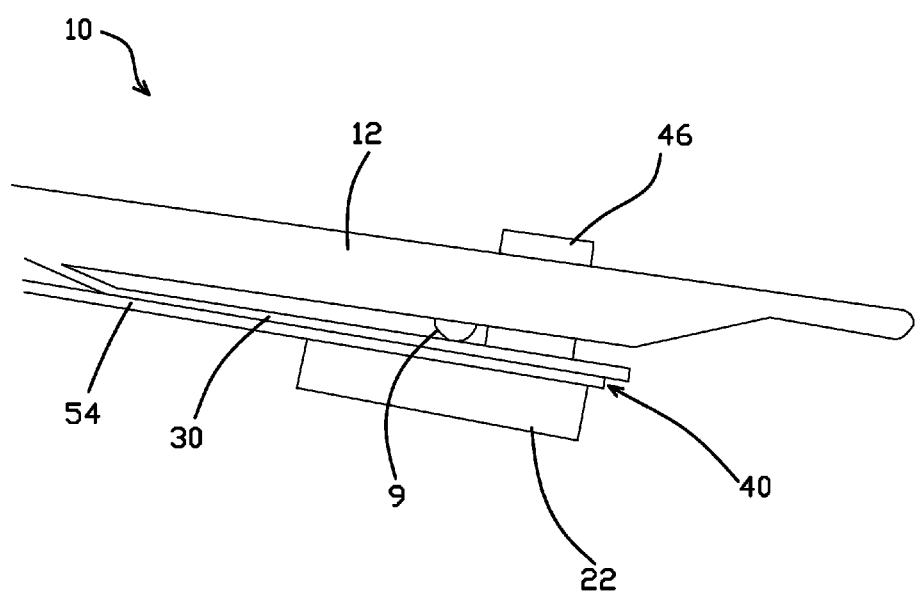
FIG. 4 is a side view of a distal portion of a head suspension assembly.

FIG. 3 shows a perspective view of the head suspension 10 in an assembled state. Specifically, FIG. 3 shows the top side of the head suspension 10. The slider 22 is on the bottom side of the head suspension 10 and is not visible in FIG. 3. FIG. 4 illustrates a side view of the head suspension 10. FIGS. 3 and 4 show a HAMR block 46. The HAMR block 46 can include components for generating focused light, such as a laser diode structure, for selectively heating the surface of the disk 4. Alternative components can be included in the HAMR block 46 or similar structure, whether related to EAMR technology or providing other functionality. As such, while HAMR technology and a HAMR block are referenced specifically herein, each of the embodiments of the present disclosure could alternatively include an EAMR block or other element of similar or different dimensions and functionality. The HAMR block 46 can be attached to the slider 22. One or more magnetic transducers can be mounted on a first side of the slider 22 while the HAMR block 46 can be mounted on a second side of the slider 22. The first side of the slider 22 can be opposite the second side. The HAMR block 46 can be bonded to a side of the slider 22 along a trailing edge to facilitate heat application coincidentally with the one or more transducers. The HAMR block 46 can be substantial in size (e.g., spanning 0.2 mm by 0.5 mm in footprint and spanning 0.2 mm or greater in height). In response, and as shown in FIG. 3, the HAMR block 46 extends through the distal window 34 of the load beam 12 and through the flexure 40. Being that the HAMR block 46 extends through the load beam 12 and the flexure 40, clearance between the HAMR block 46 and the internal edges of the windows of the load beam 12 and the flexure 40 may be required. In particular, clearance along the X-Y plane (e.g., co-planar with the major planar area of the load beam 12) may be required around the HAMR block 46. For example, clearances of 0.050 mm or more may be required of features of both the flexure 40 and the load beam 12. One feature about which sufficient clearance may be necessary is the dimple 9, which is shown in FIGS. 2-4 and is further discussed herein.

FIG. 4 shows that the load beam 12 and flexure 40 are attached to one another proximally but divide into different structures distally. In this way, the flexure 40 is cantilevered from the load beam 12. As shown in FIG. 4, the dimple 9 interfaces with the flexure 40. The rounded shape of the dimple 9 allows the flexure 40 and other components mounted on the flexure 40, such as the slider 22 and HAMR block 46, to pitch and roll relative to the load beam 12.

Figure 5A:
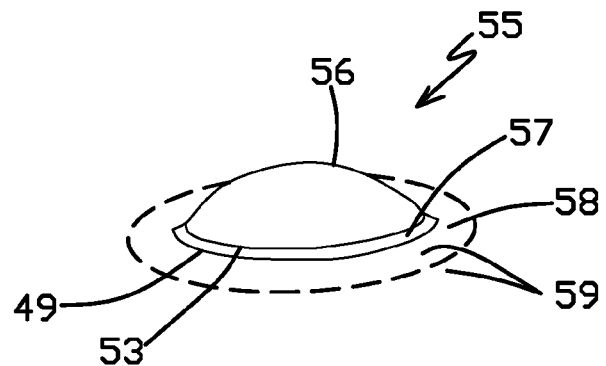
FIG. 5A is a perspective view of a load point dimple.
Figure 5B:
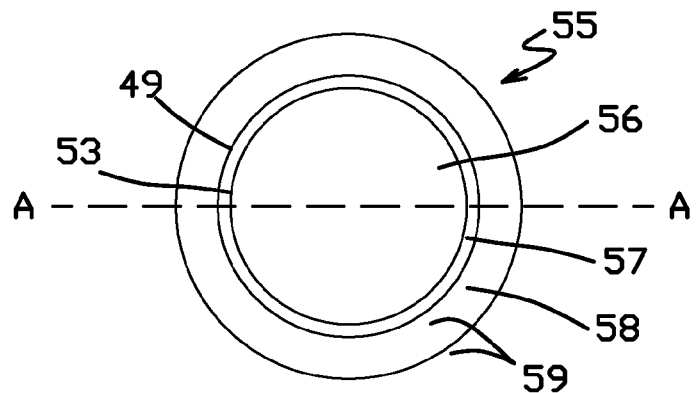
FIG. 5B is a plan view of the load point dimple of FIG. 5A.
Figure 5C:
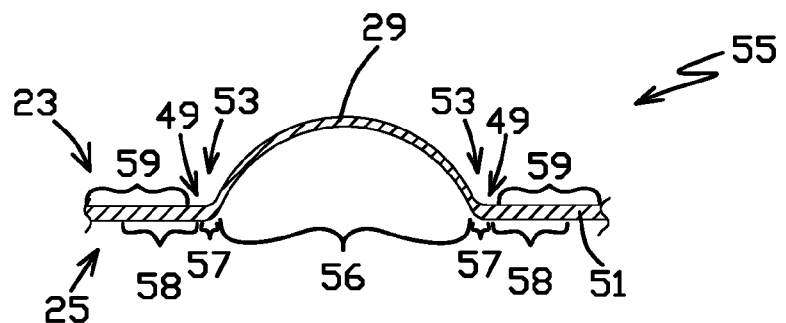
FIG. 5C is a cross sectional view of the load point dimple of FIG. 5B along line AA.

A discussion of dimples as used in suspension assemblies will be beneficial for understanding aspects of the present invention. FIGS. 5A-C show a dimple 55. Specifically, FIG. 5A shows a perspective view of the dimple 55, FIG. 5B shows a plan view of the dimple 55, and FIG. 5C shows a cross sectional view of the dimple 55 along line AA of FIG. 5B. The dimple 55 is formed from the substrate 51 of a load beam. The dimple 55 can be located within a major planar area of a load beam.

The dimple 55 has a protruding surface on a first side 23 of the substrate 51 and a recessed surface on a second side 25 of the substrate 51 that is opposite the first side 23. The dimple 55 includes an apex 29, which is the highest point of the dimple 55. The dimple 55 includes several different sections. Specifically, the dimple 55 includes a spherical indentation 56 and a transition section 57. The transition section 57 fully encircles the spherical indentation 56 and is adjacent to the spherical indentation 56. The spherical indentation 56 has a substantially uniform spherical curvature while the transition section 57 has a curvature that is different from the spherical indentation 56. Specifically, the transition section 57 transitions the curvature of the dimple 55 from the substantially uniform spherical curvature to the flat profile of the flange 58.

In some embodiments, the height of the dimple 55, as measured from the surface of the first side 23 of the substrate 51 to the apex 29, is 0.050 mm. The radius of curvature of the spherical indentation 56 can be, for example, 0.200 mm. The radius of curvature for a portion of the transition section 57 can be, for example, 0.012 mm. The thickness of the substrate can be, for example, 0.025 mm. However, larger and smaller dimensional values than those listed are also contemplated. It is noted that the Figs. shown herein may not be to scale and that some portions, such as the relative size of the transition section 57, may appear as exaggerated herein for the purpose of illustration of the various components.

The dimple 55 is fully surrounded by the flange 58 in the embodiment of FIGS. 5A-C. A flange, as referenced herein, is a planar section of a substrate (e.g., of a load beam or a flexure) that is adjacent to at least a portion of a dimple. As shown in FIG. 5B, the flange 58 peripherally encircles both of the spherical indentation 56 and the transition section 57 while being directly connected with the transition section 57 by virtue of being formed for the same substrate 51. The diameter of the flange 58 can be a "best practice" preferred value of 0.381 mm plus three times the thickness of the substrate 51. As shown in FIG. 5C, the substrate 51 is a sheet of material (e.g., metal, preferably stainless steel) that is integral and continuous along the dimple 55, the flange 58, and the major planar area 59. As indicated in FIGS. 5A-C, the flange 58 is a subportion of the major planar area 59. The flange 58 is formed from the same substrate 51 as the spherical indentation 56, the transition section 57, and the major planar area 59 and has the same thickness as the major planar area. The flange 58 can correspond to the area of the substrate 51 adjacent to the dimple 55 that is directly engaged with a clamp during the process of forming (via deformation of the substrate 51) the dimple 55, as further discussed herein. The flange 58 allows for clamping of the substrate 51 material during the formation of the dimple 55. The flange 58 is adjacent to the dimple 55 but is not part of the dimple 55 itself and is not deformed during the formation of the dimple 55.

The portion of the substrate 51 from which the spherical indentation 56 and the transition section 57 are formed is uniform with the major planar area 59 before that portion is indented. The transition section 57 transitions the profile of the substrate 51 from the planar profile of the flange 58 to the curved profile of the spherical indentation 56. As such, the flange 58 is flat and does not include a bending shape or profile, while the transition section 57 includes a bending profile that is different in curvature from the bending profile of the spherical indentation 56. The outer transition boundary 49 represents the bottom edge of the indentation where the substrate 51 first makes the transition from the flat planer surface of the flange 58 and begins to transition along a tight radius leading, eventually, into the profile of the spherical indentation 56. The outer spherical indentation boundary 53 represents the completion of the tight side transition and the start of the larger spherical radius of the spherical indentation 56. While the outer transition boundary 49 and the outer spherical indentation boundary 53 form full circles (e.g., in an X-Y plane) around the spherical indentation 56, as viewed from the plan view perspective of FIG. 5B, full circles may not be formed by similar outer transition boundaries and the outer spherical indentation boundaries in some other embodiments as further discussed herein.

Figure 6A:
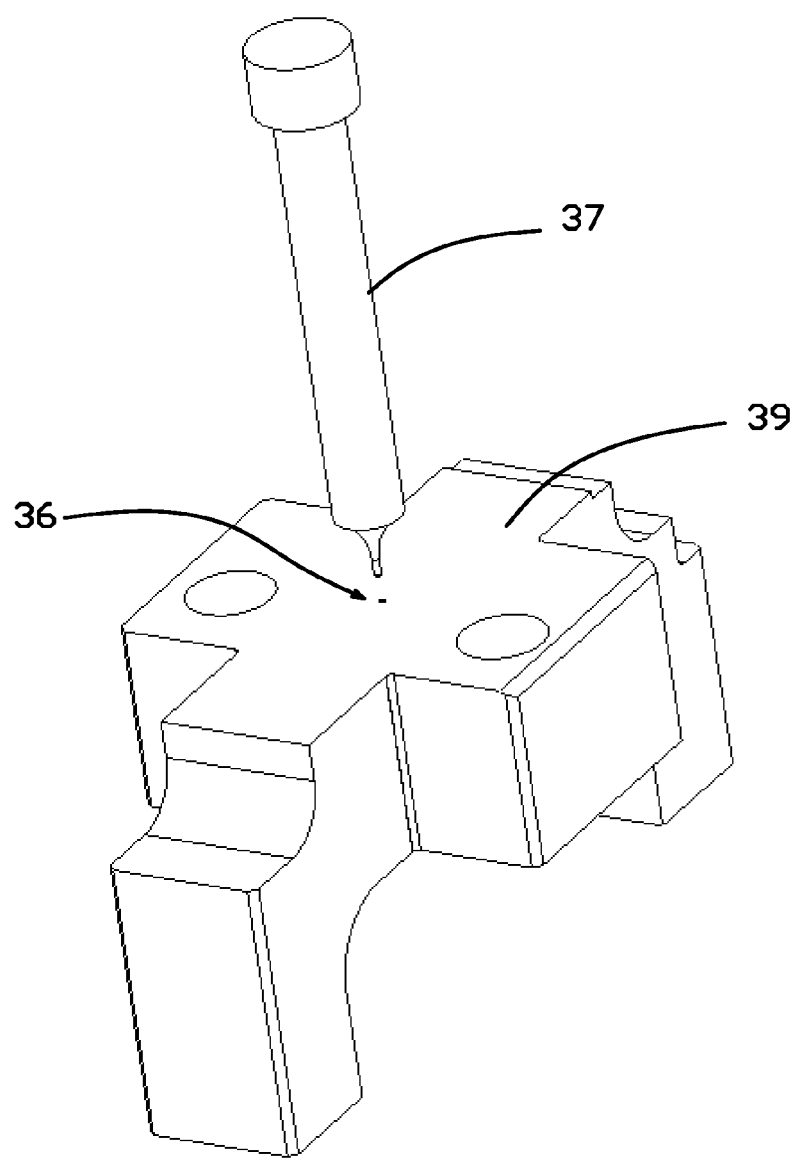
FIG. 6A is a perspective view of a forming pin and die for forming a dimple.
Figure 6B:
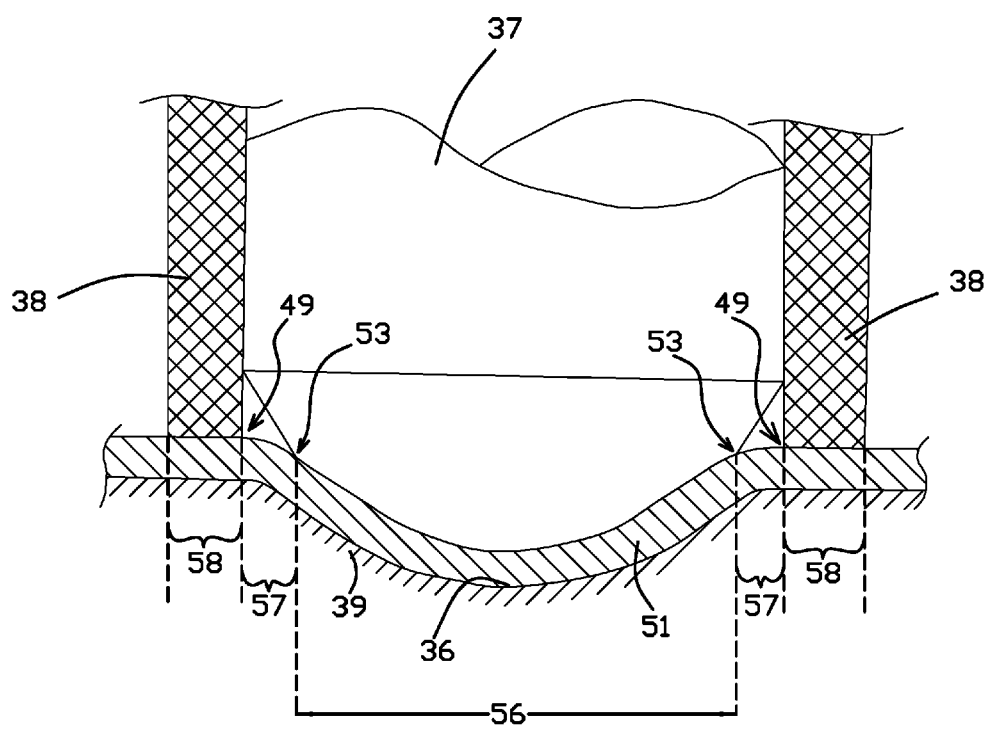
FIG. 6B is a cross sectional view of the forming pin and the die of FIG. 6A.

FIGS. 6A-B illustrate tooling for formation of a dimple. Specifically, FIG. 6A shows a perspective view of a forming pin 37 and a lower clamp 39. The lower clamp 39 includes a socket 36. The socket 36 can be a die that forms the shape of a spherical indentation together with the spherical distal end of the forming pin 37. The lower clamp 39 can be planar while the socket 36 can include a negative of the spherical indentation for forming the dimple. The substrate 51, in planar form (i.e. pre-indentation), can be placed on the lower clamp 39. FIG. 6B shows a cross sectional view of lower clamp 39 and an upper clamp 38. The substrate 51 is held between the lower clamp 39 and the upper clamp 38. Specifically, the lower clamp 39 and the upper clamp 38 engage opposite sides of the substrate 51 along the flange 58. When clamped, the forming pin 37 can be pressed into the substrate 51 to plastically deform the substrate 51 and form the dimple 55. Specifically, the substrate 51 is deformed to have a spherical indentation 56 and a transition section 57 while the flange 58, being clamped, is not deformed by this process. Any dimple referenced herein can be formed in the same manner and can have the same features as the dimple 55 of FIGS. 5A-C or as described above, except for modifications as further discussed herein.

Returning to FIGS. 5A-C, it is noted that the flange 58 fully surrounds the transition section 57 and the spherical indentation 56 because the targeted placement of the dimple 55 (e.g., via the forming process of FIGS. 6A-B) was a sufficient distance from any other feature of the substrate 51 (e.g., a window or other type of void in the substrate 51) that a planar region of undeformed substrate 51 was left to fully encircled the dimple 55. In some load beams, to accommodate the flange 58 in fully surrounding the transition section 57 and the spherical indentation 56, the apex of a dimple might be located 0.228 mm from an edge of a window or other feature, wherein the flange 58 may otherwise overlap with the window to leave a discontinuity in the flange 58. As such, the flange 58 of FIGS. 5A-C can be fully formed by allowing a minimum distance between the dimple 55 (e.g., the apex or center of the dimple 55) and any other feature of a load beam. However, leaving a full flange 58 takes up precious space on the lead beam.

As previously discussed, the addition of HAMR components, such as a HAMR block 46 extending through the distal window 34 as shown in FIGS. 3-4, places a greater need on enlarging the distal window 34 so that the distal window 34 can accommodate the HAMR block 46 or other feature. However, the provision of a flange 58 that fully surrounds the spherical indentation 56 limits the degree to which the distal window 34 can be enlarged before the proximal edge of the distal window 34 overlaps the full flange 58. The inventors of the subject matter of the present disclosure have determined that a dimple can be formed without part of a flange while still maintaining the structural integrity and function of the dimple. Accordingly, various embodiments of the present disclosure concern forming dimples such that the flanges do not fully surround the dimples. Such embodiments are further discussed herein.

Figure 7A:
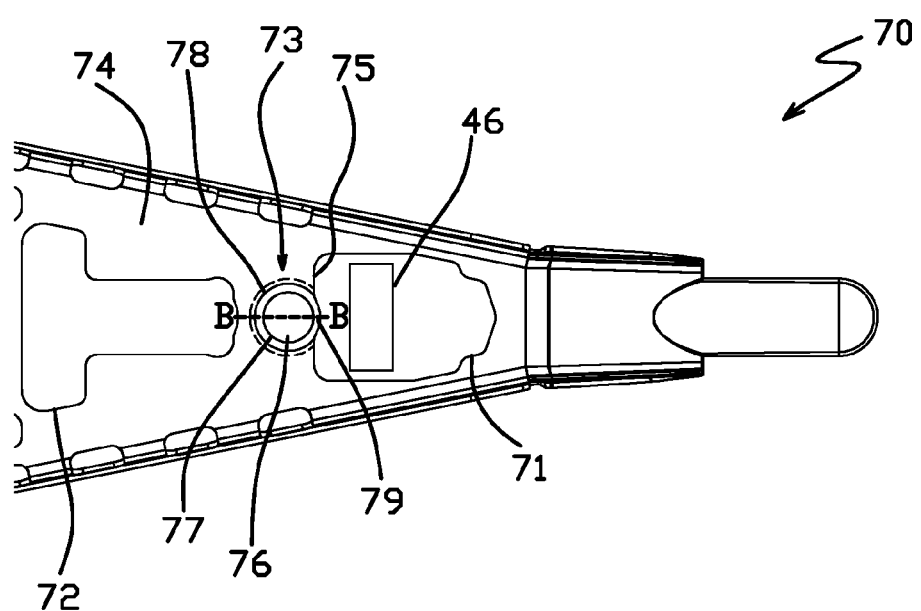
FIG. 7A is a plan view of a partially flangeless dimple on a load beam.
Figure 7B:
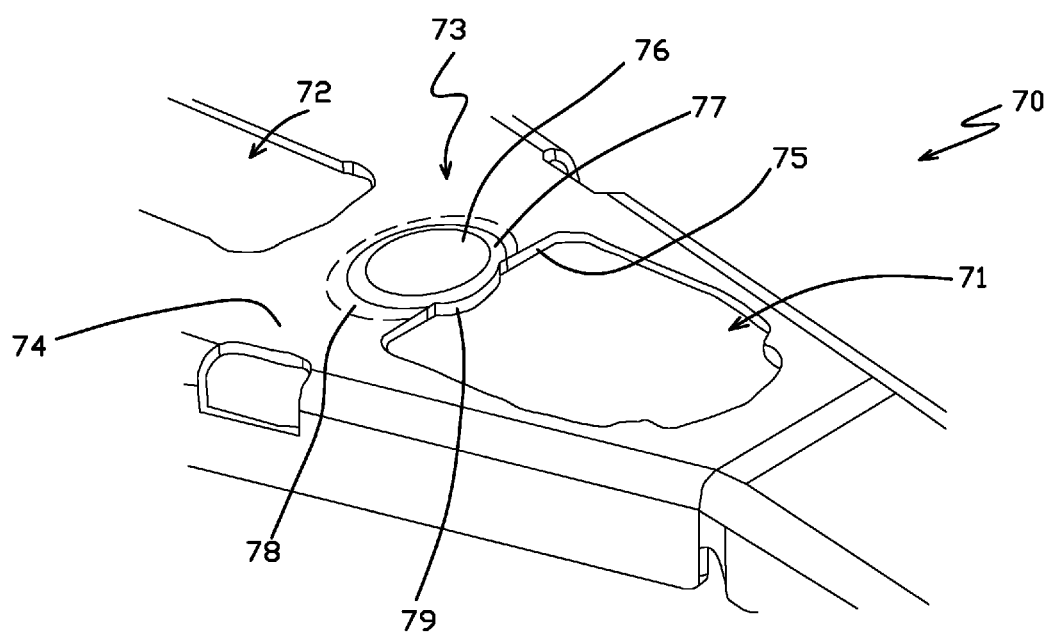
FIG. 7B is a perspective view of the partially flangeless dimple of FIG. 7A.
Figure 7C:
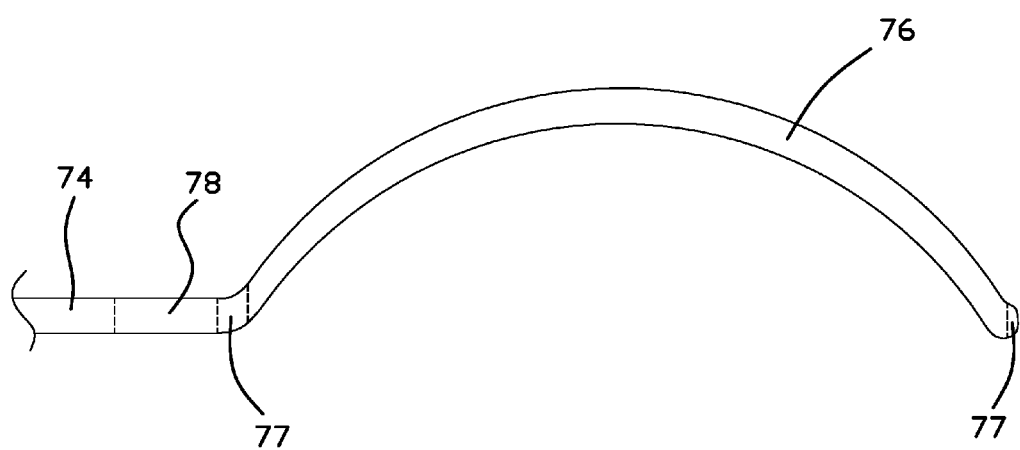
FIG. 7C is a cross sectional view of the partially flangeless dimple of FIG. 7A along line BB.

FIG. 7A shows a plan view of a load beam 70 while FIG. 7B shows a perspective view of a portion of the load beam 70. FIG. 7C shows a cross sectional view along line BB of FIG. 7A. The load beam 70 can be formed similarly to any other embodiment disclosed herein except where noted. The load beam 70 is generally planar and includes a major planar area 74 that extends over much of the load beam 70 (e.g., half or more of the surface area of a top or bottom side of the load beam 70, however the coverage may be less in some embodiments). The load beam 70 includes a proximal window 72. The load beam 70 also includes a distal window 71 through which a HAMR block or other element can extend, however such a HAMR block is not shown in FIG. 7B for clarity. The distal window 71 includes a proximal edge 75. The distal window 71 is fully enclosed within the major planar area 74 of the load beam 70 (i.e. the distal window 71 does not include a side opening in the X-Y plane). The load beam 70 further includes a dimple 73 that is only partially surrounded by a flange 78. The flange 78 is a region of the major planar area 74 that extends partially around the dimple 73, but does not extend along a distal edge 79 of the dimple 73. For example, the flange 78 is adjacent to the proximal side and the lateral sides of the dimple 73 while the distal edge 79 of the dimple 73 is adjacent to the distal window 71. The distal edge 79 faces into the window 71 or otherwise defines an edge of the distal window 71. The distal edge 79 of the dimple 73 extends from a left distal truncation of the flange 78 to a right distal truncation of the flange 78. The flange 78 extends around the proximal side and the lateral sides of the transition section 77 of the dimple 73 but the flange 78 terminates at the proximal edge 75 such that the flange 78 does not extend along the distal edge 79 of the transition section 77. The absence of the flange 78 along the distal edge 79 of the dimple 73 allows the distal window 71 to be enlarged past where the flange 78 would have otherwise been, and as such the absence of the flange 78 along the distal edge 79 of the dimple 73 allows the load beam 70 to accommodate a HAMR block or other component or otherwise allows for a more compact configuration. Use of a partially flangeless dimple as described herein can result in a clearance between the distal edge 79 and a HAMR block of 0.139 mm in some embodiments.

It is noted that the radius of the transition section 77 (e.g., as measured from the center of the spherical indentation 76) is not consistent peripherally around the dimple 73. Specifically, the transition section 77 has a relatively larger radius along the proximal side and the lateral sides of the transition section 77 and a relatively smaller radius along the distal side of the transition section 77. As shown in FIGS. 7A-B, the transition section 77 is partially truncated at the proximal edge 75 such that a limited portion of the transition section 77 projects past the proximal edge 75 and into the distal window 71. In some other embodiments, the transition section 77 is not truncated at the proximal edge 75 such that the full radius of the transition section 77 projects past the proximal edge 75 and into the distal window 71. In some other embodiments, the transition section 77 is fully truncated at the proximal edge 75 such that no part of the transition section 77 projects past the proximal edge 75 into the distal window 71. In such cases, the proximal edge 75 may be linear between the lateral edges of the distal window 71. In any case, the spherical indentation 76 is not truncated in the illustrated embodiment.

As shown, the transition section 77 of the dimple 73 extends distally of the proximal edge 75 of the distal window 71, thereby projecting into the distal window 71. In this way, the proximal edge 75 is not linear between the lateral edges of the distal window 71. The distal edge of the spherical indentation 76 does not extend distally of the proximal edge 75 of the distal window 71 in the embodiment shown in FIGS. 7A-C. In some embodiments, the distal edge of the spherical indentation 76 is aligned with the proximal edge 75 of the distal window 71 while in some other embodiments the distal edge of the spherical indentation 76 terminates distally of the proximal edge 75. In some other embodiments, the spherical indentation 76 extends distally of the proximal edge 75, thereby projecting into the distal window 71.

Figure 8A:
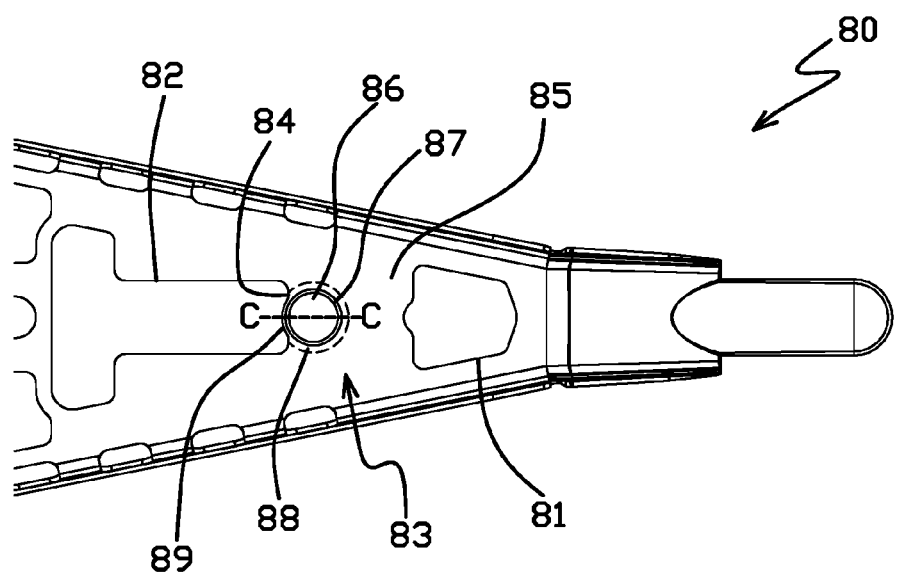
FIG. 8A is a plan view of a partially flangeless dimple on a load beam.
Figure 8B:
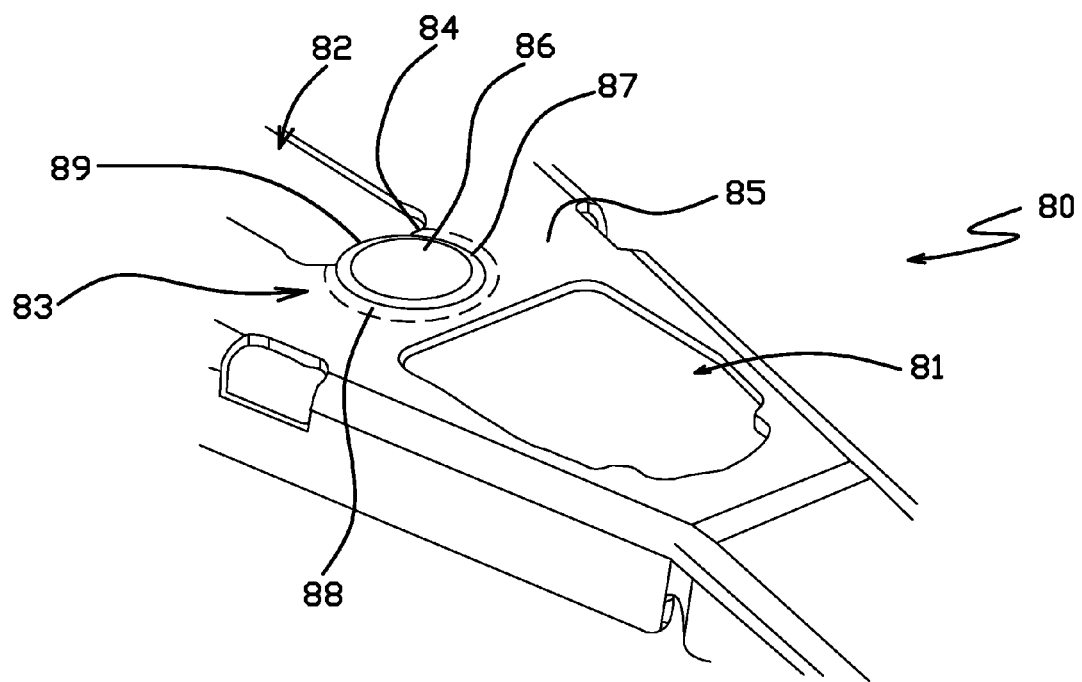
FIG. 8B is a perspective view of the partially flangeless dimple of FIG. 8A.
Figure 8C:
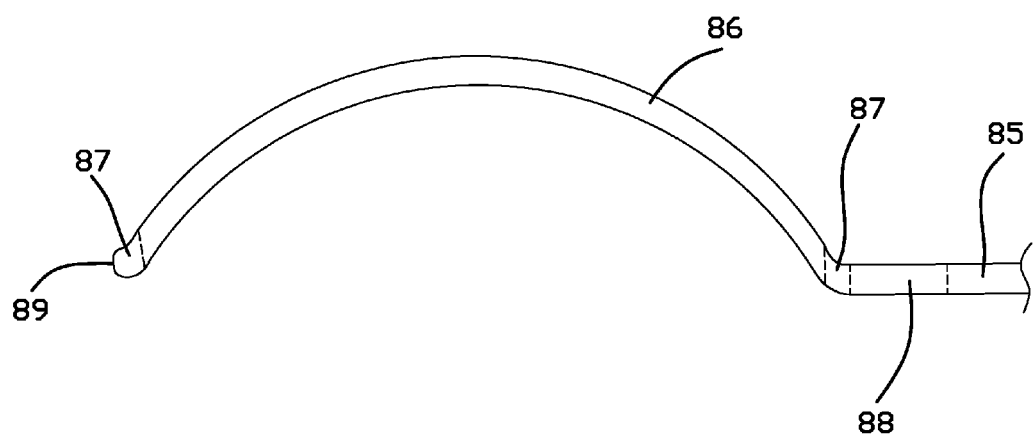
FIG. 8C is a cross sectional view of the partially flangeless dimple of FIG. 8A along line CC.

FIG. 8A shows a plan view of a load beam 80 while FIG. 8B shows a perspective view of a portion of the load beam 80. FIG. 8C shows a cross sectional view along line CC of FIG. 8A. The load beam 80 can be formed similarly to any other embodiment disclosed herein except where noted. The load beam 80 is generally planar and includes a major planar area 85 that extends over much of the load beam 80. The load beam 80 includes a proximal window 82. The proximal window 82 includes a distal edge 84. The proximal window 82 is fully enclosed within the major planar area 85 of the load beam 80 (i.e. the proximal window 82 does not include a side opening). The load beam 80 further includes a dimple 83 that is only partially surrounded by a flange 88. The flange 88 is a region of the major planar area 85 that extends partially around the dimple 83, but does not extend along a proximal edge 89 of the dimple 83. For example, the flange 88 is adjacent to the distal side and the lateral sides of the dimple 83 while the proximal edge 89 of the dimple 83 is adjacent to the proximal window 82. The proximal edge 89 faces into the proximal window 82 or otherwise defines an edge of the proximal window 82. The proximal edge 89 of the dimple 83 extends from a left proximal truncation of the flange 88 to a right proximal truncation of the flange 88. The flange 88 extends around the distal side and the lateral sides of the transition section 87 of the dimple 83, but the flange 88 terminates at the distal edge 84 such that the flange 88 does not extend along the proximal side of the transition section 87. The absence of the flange 88 along the proximal side of the dimple 83 allows the proximal window 82 to be enlarged past where the flange 88 would have otherwise been, and as such the absence of the flange 88 along the proximal side of the dimple 83 allows the proximal window 82 to accommodate components or otherwise allows for a more compact configuration.

It is noted that the radius of the transition section 87 is consistent peripherally around the entire dimple 83. However, the proximal side of the transition section 87 could be modified to be radially smaller than the distal side of the transition section 87. In some cases, a portion of the proximal side of the transition section 87 can be truncated in a similar manner as the distal side of the transition section 77 of FIGS. 7A-B. In some other embodiments, the transition section 87 is fully truncated at the distal edge 84 such that no part of the transition section 87 projects past the distal edge 84 into the proximal window 82. In such cases, the distal edge 84 may be linear between the lateral edges of the proximal window 82.

As shown, the transition section 87 of the dimple 83 extends proximally of the distal edge 84 of the proximal window 82, thereby projecting into the proximal window 82. In this way, the distal edge 84 is not linear between the lateral edges of the proximal window 82. The proximal edge of the spherical indentation 86 does not extend proximally of the distal edge 84 of the proximal window 82 in the embodiment shown in FIGS. 8A-B. In some embodiments, the proximal edge of the spherical indentation 86 is aligned with the distal edge 84 of the proximal window 82. In some other embodiments, the spherical indentation 86 extends proximally of the distal edge 84, thereby projecting into the proximal window 82.

Figure 9A:
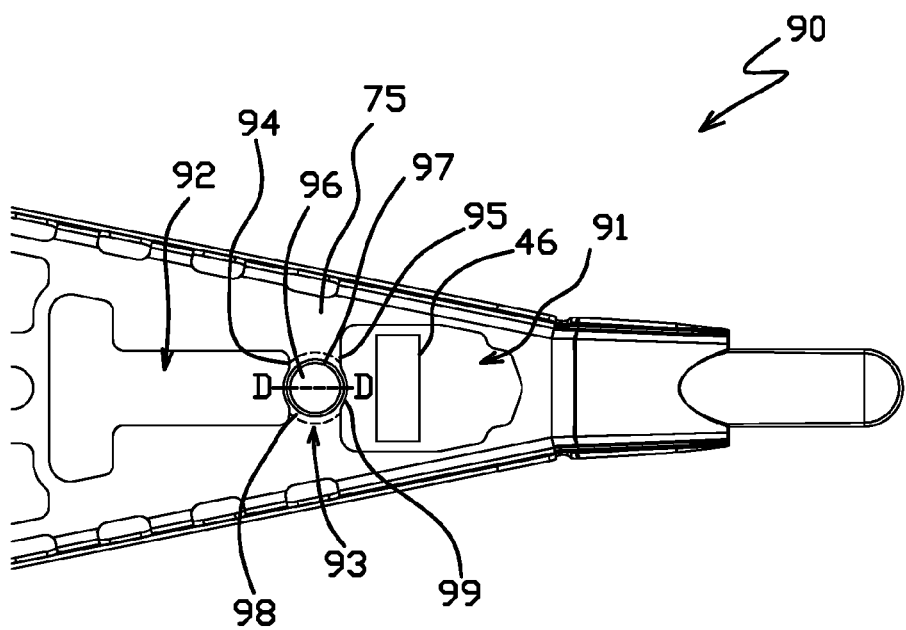
FIG. 9A is a plan view of a partially flangeless dimple on a load beam.
Figure 9B:
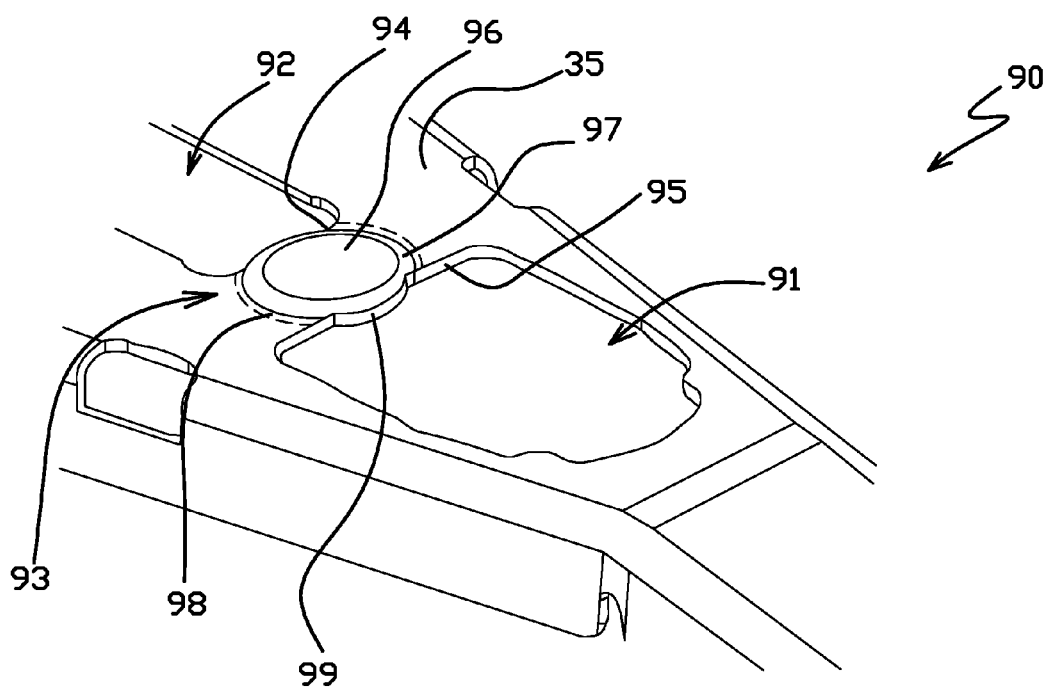
FIG. 9B is a perspective view of the partially flangeless dimple of FIG. 9A.
Figure 9C:
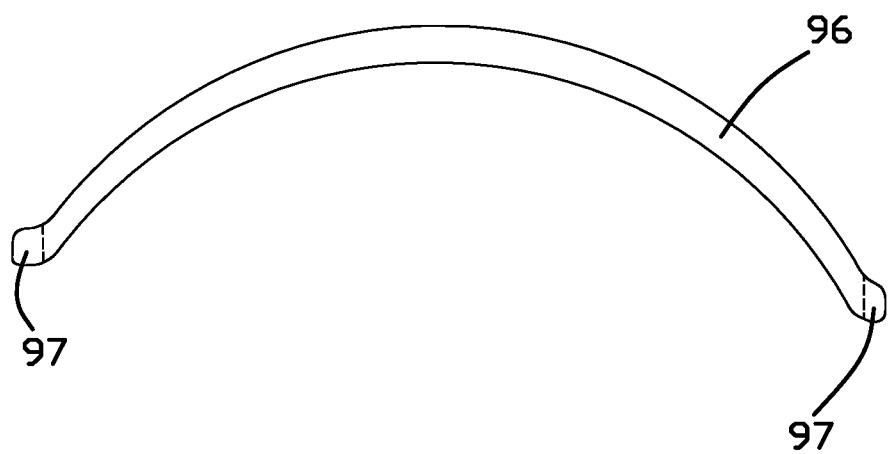
FIG. 9C is a cross sectional view of the partially flangeless dimple of FIG. 9A along line DD.

FIG. 9A shows a plan view of a load beam 90 while FIG. 9B shows a perspective view of a portion of the load beam 90. FIG. 9C shows a cross sectional view along line DD of FIG. 9A. The load beam 90 can be formed similarly to any other embodiment disclosed herein except where noted. The load beam 90 is generally planar and includes a major planar area 35 that extends over much of the load beam 90. The load beam 90 includes a distal window 91 through which a HAMR block can extend. The distal window 91 includes a proximal edge 95. The load beam 90 also includes a proximal window 92. The proximal window 92 includes a distal edge 94. The load beam 90 further includes a dimple 93 that is partially surrounded by a flange 98. The flange 98 extends around the lateral sides of the transition section 97 of the dimple 93 but the flange 98 terminates at the proximal edge 95 and the distal edge 94 such that the flange 98 does not extend along the distal side or the proximal side of the dimple 93. The flange 98 is a region of the major planar area 35 that extends partially around the dimple 93 but does not extend along a distal edge 99 of the dimple 93 such that the distal edge 99 of the dimple 93 is adjacent to the distal window 91. In some alternative embodiments, the flange 98 may not extend along the proximal edge 95 of the dimple 93.

The radius of the transition section 97 is not consistent peripherally around the dimple 93. Specifically, the transition section 97 has a relatively larger radius along the proximal side and the lateral sides of the transition section 97 and a relatively smaller radius along the distal side of the transition section 97. As shown in FIGS. 9A-B, the transition section 97 is partially truncated at the proximal edge 95 such that a limited portion of the transition section 97 projects past the proximal edge 95 and into the distal window 91. In some other embodiments, the transition section 97 is not truncated at the proximal edge 95 such that the full radius of the transition section 97 projects past the proximal edge 95 and into the distal window 91. In some other embodiments, the transition section 97 is fully truncated at the proximal edge 95 such that no part of the transition section 97 projects past the proximal edge 95 into the distal window 91. In such cases, the proximal edge 95 may be linear between the lateral edges of the distal window 91.

The transition section 97 of the dimple 93 extends distally of the proximal edge 95 of the distal window 91, thereby projecting into the distal window 91. The distal edge of the spherical indentation 96 does not extend distally of the proximal edge 95 of the distal window 91 in the embodiment shown in FIGS. 9A-B. In some embodiments, the distal edge of the spherical indentation 96 is aligned with the proximal edge 95 of the distal window 91 while in some other embodiments the distal edge of the spherical indentation 96 terminates distally of the proximal edge 95. In some other embodiments, the spherical indentation 96 extends distally of the proximal edge 95, thereby projecting into the distal window 91.

In some cases, a portion of the proximal side of the transition section 97 can be truncated in a similar manner as the distal side of the transition section 97. In some other embodiments, the transition section 97 is fully truncated at the distal edge 94 such that no part of the transition section 97 projects past the distal edge 94 into the proximal window 92. In such cases, the distal edge 94 may be linear between the lateral edges of the proximal window 92.

The transition section 97 of the dimple 93 extends proximally of the distal edge 94 of the proximal window 92, thereby projecting into the proximal window 92. In this way, the distal edge 94 is not linear between the lateral edges of the proximal window 92. The distal edge of the spherical indentation 96 does not extend proximally of the distal edge 94 of the proximal window 92 in the embodiment shown in FIGS. 9A-B. In some embodiments, the distal edge of the spherical indentation 96 is aligned with the distal edge 94 of the proximal window 92. In some other embodiments, the spherical indentation 96 extends proximally of the distal edge 94, thereby projecting into the proximal window 92.

Figure 10A:
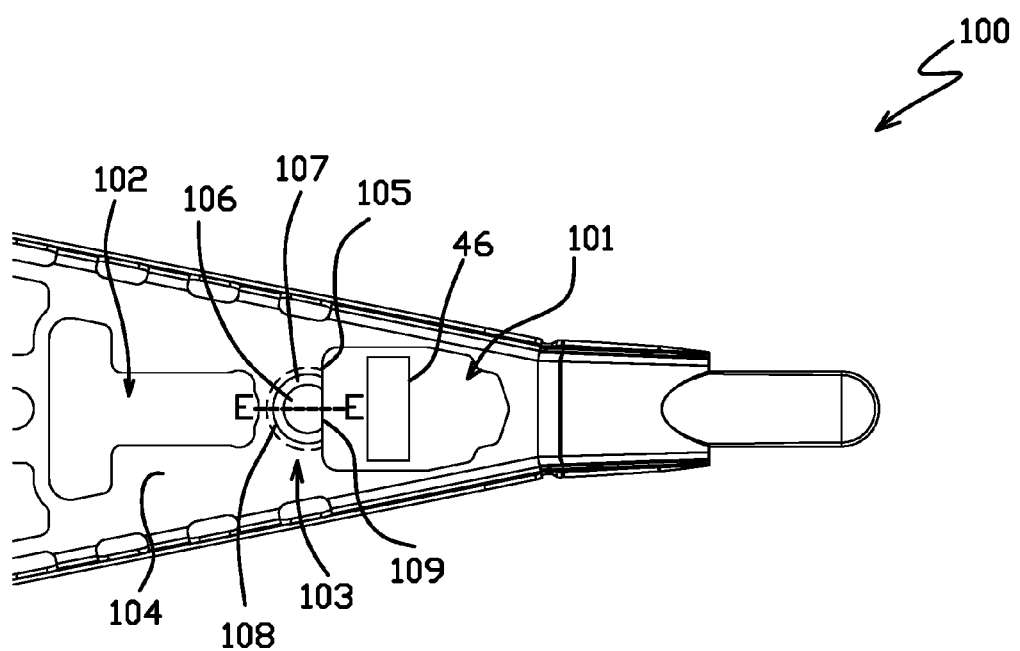
FIG. 10A is a plan view of a partially flangeless dimple on a load beam.
Figure 10B:
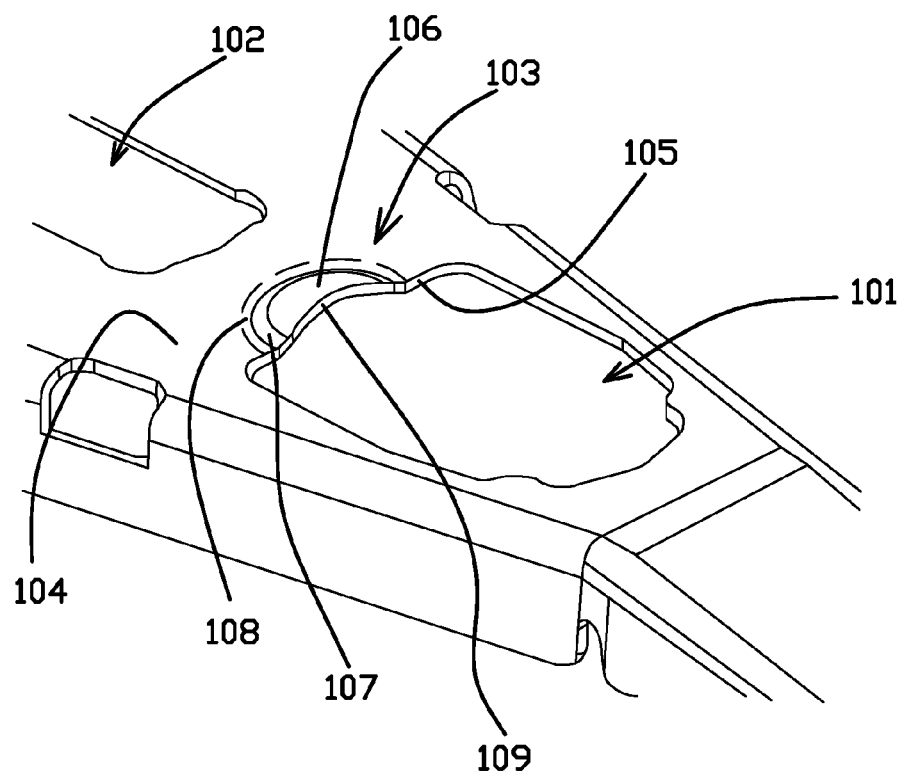
FIG. 10B is a perspective view of the partially flangeless dimple of FIG. 10A.
Figure 10C:
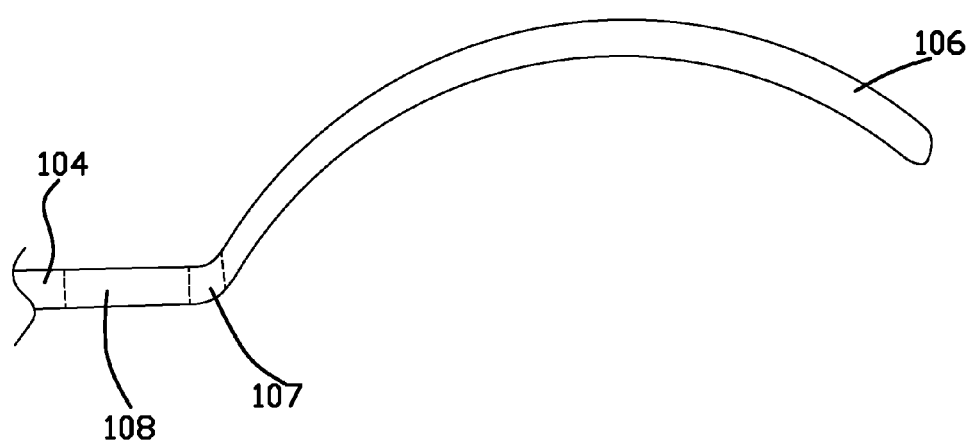
FIG. 10C is a cross sectional view of the partially flangeless dimple of FIG. 10A along line EE.

FIG. 10A shows a plan view of the load beam 100 while FIG. 10B shows a perspective view of a portion of the load beam 100. FIG. 10C shows a cross sectional view along line EE of FIG. 10A. The load beam 100 can be formed similarly to any other embodiment disclosed herein except where noted. The load beam 100 is generally planar and includes a major planar area 104 that extends over much of the load beam 100. The load beam 100 includes a proximal window 102. The load beam 100 also includes a distal window 101 through which a HAMR block or other element can extend. The distal window 101 includes a proximal edge 105. The load beam 100 further includes a dimple 103 that is partially surrounded by flange 108. The flange 108 is a region of the major planar area 104 that extends partially around the dimple 103 but does not extend along a distal edge 109 of the dimple 103 such that the distal edge 109 of the dimple 103 is adjacent to the distal window 101. The distal edge 109 of the dimple 103 extends from a left distal truncation of the flange 108 to a right distal truncation of the flange 108. The flange 108 extends around the proximal side and the lateral sides of the transition section 107 of the dimple 103, but the flange 108 terminates at the proximal edge 105 such that the flange 108 does not extend along the distal side of the transition section 107. The absence of the flange 108 along the distal side of the dimple 103 allows the distal window 101 to be enlarged past where the flange 108 would have otherwise been, and as such the absence of the flange 108 along the distal side of the dimple 103 allows the load beam 100 to accommodate a HAMR block or other component or otherwise allows for a more compact configuration.

It is noted that the spherical indentation 106 is truncated such that the spherical indentation 106 does not extend past the proximal edge 105 of the distal window 101. In this way, the proximal edge 105 is linear between the lateral edges of the distal window 101. It is noted that the apex of the dimple 103 (i.e., the highest point of the dimple 103) is still present to provide a contact point with the flexure 40. However, the spherical indentation 106 is truncated such that the distal edge of the spherical indentation 106 coincides with the proximal edge 105 for a portion of the proximal edge 105 and the proximal edge 105 is raised along the portion relative to the major planar area 104.

The termination of the dimple 103 creates a lateral cutout in the spherical indentation 106 such that the spherical indentation 106 is not a complete dome having a full circular outer profile. For example, the spherical indentation 106 is asymmetric. The lateral cutout along the curvature of the spherical indentation 106 causes the proximal edge 105 of the distal window 101 to be curved upward, as shown in FIG. 10B. In other words, the proximal edge 105 of the distal window 101 is raised along the spherical indentation 106 but is flat laterally of the dimple 103 and level with the major planar area 104. It is noted that the distal window 101 can be expanded or moved distally and/or the spherical indentation 106 can be moved proximally to create a larger cutout of the spherical indentation 106. In some cases, the distal edge of the spherical indentation 106 (i.e., the proximal edge 105 of the distal window 101) is adjacent to, and distal of, the apex of the spherical indentation 106 such that almost half of the spherical indentation 106 is absent. In some embodiments, the truncation of the dimple 103 reduces the footprint of the spherical indentation 106 (e.g., in the X-Y plane or as viewed from a plan perspective) by 30-40% relative to a full spherical indentation as shown elsewhere herein.

While the distal edge of the spherical indentation 106 coincides with the proximal edge 105 such that the spherical indentation 106 does not project into the distal window 101 in the illustrated embodiment, the spherical indentation 106 can project into the distal window 101 while still being truncated in some other embodiments. Likewise, the transition section 107 can project into the distal window 101 while still being truncated. In such alternative embodiments, the transition section 107 does not extend fully around the spherical indentation 106 and/or the transition section 107 has an inconsistent radius around the periphery of the spherical indentation 106.

The truncation of the spherical indentation 106 and the transition section 107 can occur by first forming a full spherical indentation and then selectively removing a portion of the spherical indentation 106 (e.g., by etching or cutting). The removal step can be performed when forming the distal window 101 and/or while or after forming the dimple 103. In some other embodiments, the spherical indentation 106 and transition section 107 are formed, as truncated, by indenting the substrate at a location proximate the distal window 101 such that the proximal edge 105 extends through the socket of the die that forms the spherical indentation 106. Any embodiment referenced herein can be fabricated similarly.

Figure 11A:
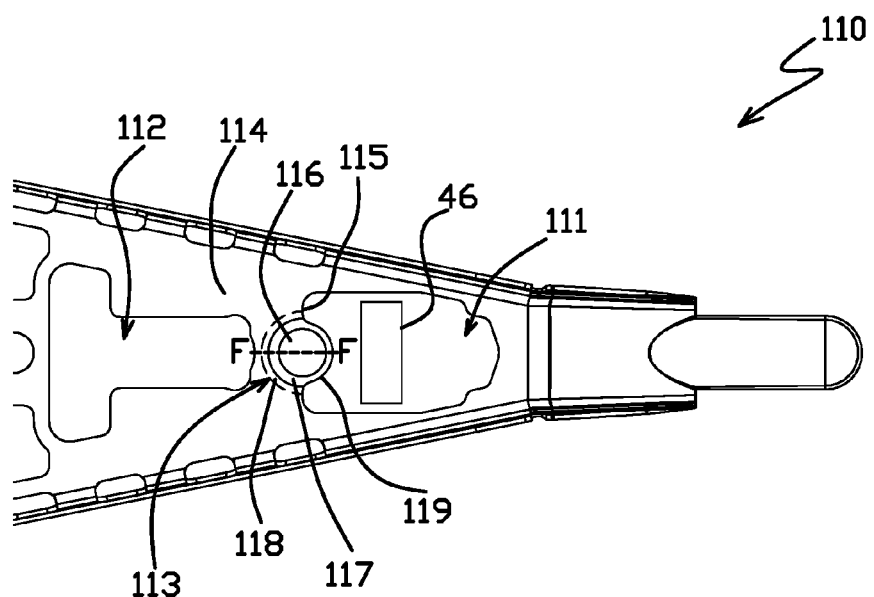
FIG. 11A is a plan view of a partially flangeless dimple on a load beam.
Figure 11B:
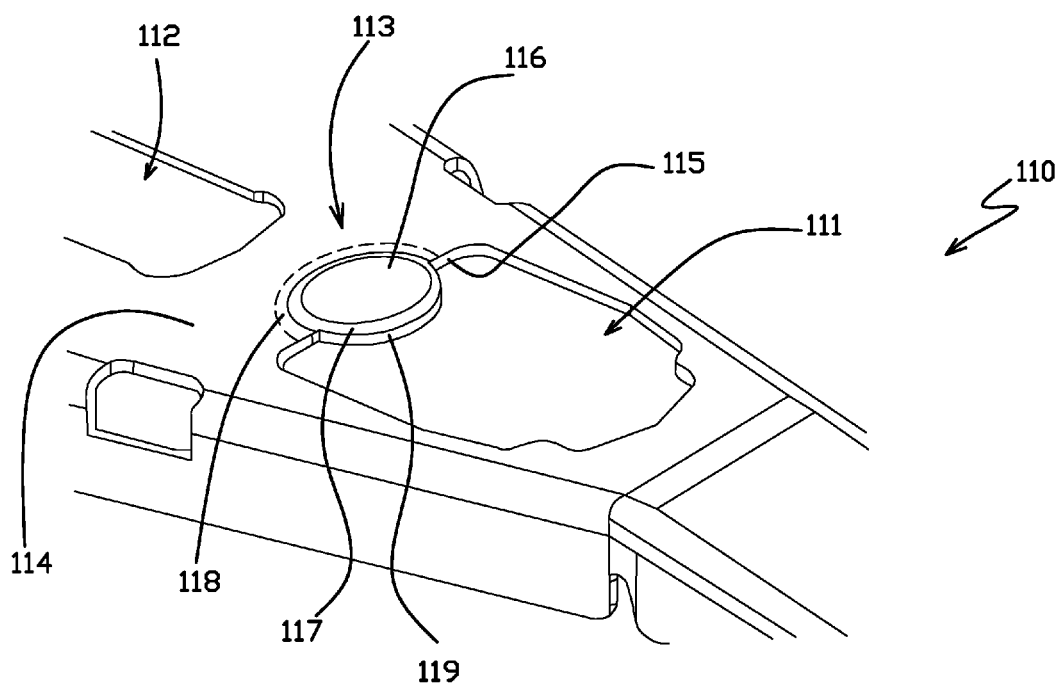
FIG. 11B is a perspective view of the partially flangeless dimple of FIG. 11A.
Figure 11C:
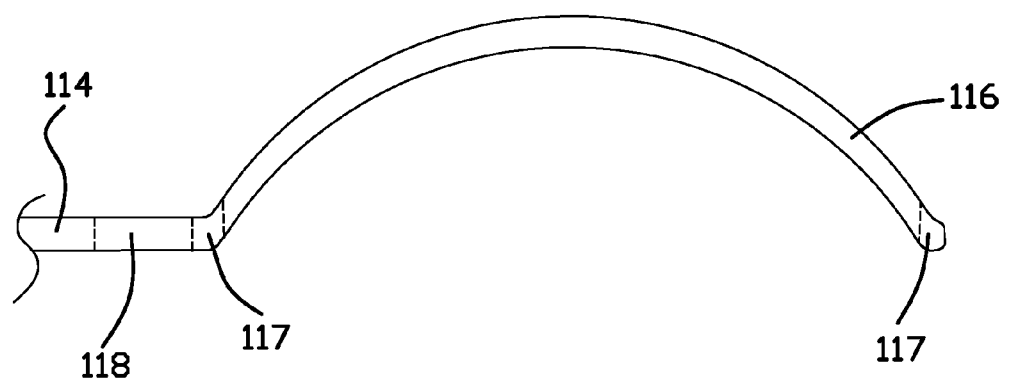
FIG. 11C is a cross sectional view of the partially flangeless dimple of FIG. 11A along line FF.

FIG. 11A shows a plan view of a load beam 110 while FIG. 11B shows a perspective view of a portion of the load beam 110. FIG. 11C shows a cross sectional view along line FF of FIG. 11A. The load beam 110 can be formed similarly to any other embodiment disclosed herein except where noted. The load beam 110 is generally planar and includes a major planar area 114 that extends over much of the load beam 110. The load beam 110 includes a proximal window 112. The load beam 110 also includes a distal window 111 through which a HAMR block or other component can extend. The distal window 111 includes a proximal edge 115. The load beam 110 further includes a dimple 113 that is partially surrounded by flange 118. The flange 118 is a region of the major planar area 114 that extends partially around the dimple 113 but does not extend along a distal edge 119 of the dimple 113 such that the distal edge 119 of the dimple 113 is adjacent to the distal window 111. The distal edge 119 of the dimple 113 extends from a left distal truncation of the flange 118 to a right distal truncation of the flange 118. The flange 118 extends around the proximal side and partially along the lateral sides of the transition section 117 of the dimple 113. The flange 118 terminates at the proximal edge 115 such that the flange 118 does not extend along the distal side of the transition section 117.

The dimple 113 extends distally of the proximal edge 115 of the distal window 111, thereby projecting into the distal window 111. Specifically, both of the spherical indentation 116 and the transition section 117 extend distally of the proximal edge 115 and into the distal window 111. As shown in FIGS. 11A-B, the apex of the spherical indentation 116 is aligned with the proximal edge 115 of the distal window 111. In some other embodiments, the apex of the spherical indentation 116 can be distal of the proximal edge 115 of the distal window 111 such that a majority of the spherical indentation 116 (e.g., by surface area or mass) projects into the distal window 111. In yet further embodiments, the apex of the spherical indentation 116 can be proximal of the proximal edge 115 of the distal window 111 such that a majority of the spherical indentation 116 is proximal of the proximal edge 115.

The spherical indentation 116 is not truncated in the embodiment of FIGS. 11A-B. In this way, the spherical indentation 116 comprises a full circular profile. In some other embodiments, the spherical indentation 116 can be truncated such that the spherical indentation 116 does not define a full circular profile. For example, even though a portion of the spherical indentation 116 can extend distally of the proximal edge 115 and into the distal window 111, a distal section of the spherical indentation 116 can nevertheless be truncated, the truncation of the spherical indentation 116 distal of the proximal edge 115.

The radius of the transition section 117 is not consistent peripherally around the dimple 113. Specifically, the transition section 117 has a relatively larger radius along the proximal side and the lateral sides of the transition section 117 and a relatively smaller radius along the distal side of the transition section 117. As shown in FIGS. 11A-B, the transition section 117 is partially truncated at the proximal edge 115 such that a limited portion of the transition section 117 projects past the proximal edge 115 and into the distal window 111. In some embodiments, the truncation of the flange 118 extends proximally to the apex of the spherical indentation 116.

In some other embodiments, the transition section 117 is not truncated at the proximal edge 115 such that the full radius of the transition section 117 projects past the proximal edge 115, into the distal window 111, and around the distal side of the transition section 117. In some other embodiments, the transition section 117 is fully truncated at the proximal edge 115 such that no part of the transition section 117 projects past the proximal edge 115 into the distal window 111. In such cases, the proximal edge 115 may be linear between the lateral edges of the distal window 111.

Figure 12A:
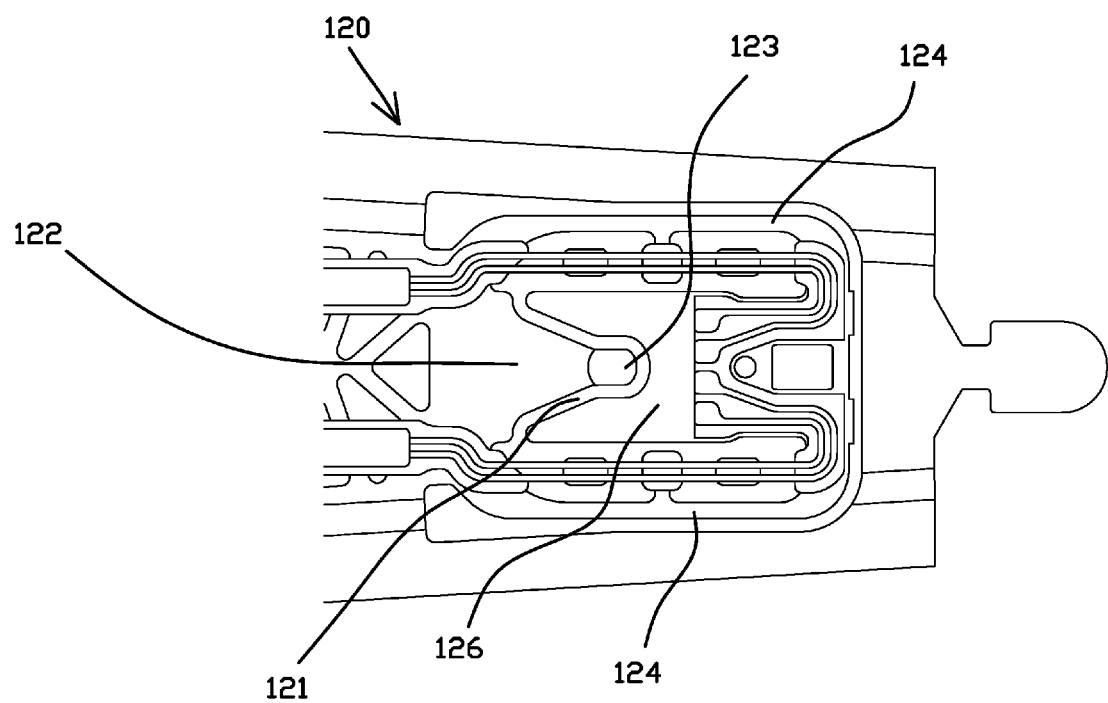
FIG. 12A is a plan view of a partially flangeless dimple on a load beam.

FIG. 12A shows a plan view of a load beam 120 while FIG. 12B shows a detailed view of a portion of the load beam 120. The load beam 120 can be formed similarly to any other embodiment disclosed herein except where noted. While previous embodiments have shown load beams having windows as a type of void along which a dimple and/or flange can terminate and of which the dimple is accordingly adjacent to and optionally projects therein, the load beam 120 of FIGS. 12A-B has a dimple 123 that extends into another type of void 121. The void 121 in this case is a cutout in the load beam 120 that allows components of the head suspension to move relative to one another. For example, the spring arms 124 allow the proximal portion 122 of the load beam 120 to move relative to a distal portion 126 of the load beam 120. The void 121 separates the proximal portion 122 from the distal portion 126. The dimple 123 can function as a load point that allows pitch and roll of flexure.

As shown in FIG. 12B, the dimple 123 extends from the proximal portion 122 of the load beam 120. A flange 128, connecting the dimple 123 to the load beam 120, is provided only along the proximal side of the dimple 123. As such, the flange 128 does not extend along the lateral sides (left and right) or the distal side of the dimple 123. The transition section 127, which corresponds to the edge of the dimple 123 that transitions the substrate from the planar profile of the proximal portion 122 to the spherical indentation 133 of the substrate, extends only along the proximal side of the dimple 123 and does not extend along the lateral sides or the distal side of the dimple 123. In some other embodiments, the transition section 127 can extend along any of the lateral sides and the distal side of the dimple 123.

The spherical indentation 133 is truncated in the embodiment of FIG. 12B. In this way, the spherical indentation 133 does not comprise a full circular profile. The truncation of the spherical indentation 133 creates lateral truncated sides 130 and a distal truncated side 131, each of which is liner from an overhead profile along X-Y plane but is curved in a Z-axis. In some other embodiments, the spherical indentation 133 may not be truncated on one or more of the lateral sides or the distal side which can change the curvature of the lateral sides 130 and the distal side 131 from that shown. It is noted that the dimple 123 extends distally of the distal edge 125 of the proximal portion 122 of the load beam 120. The distal edge 125 is not linear as shown in FIGS. 12A-B, however the distal edge 125 can be linear in some alternative embodiments.

It is noted that the additional clearance that a partial flange affords could be used for applications other than EAMR technology. Additional room can be provided to accommodate other components of other forms of EAMR including but not limited to additional sensors attached to the backside of the slider, additional pads and/or terminations on the back side of the slider, a laser Doppler vibrometer, optical components, or other velocity and/or displacement measurement components on the backside of a slider surface or gimbal tongue surface for gimbal or slider air bearing surface dynamics characterization, or other needs benefiting from additional clearance.

It is noted that the concepts presented herein can be applied to any void, including a window, such that any dimple configuration demonstrated in one embodiment herein can be used in connection with another embodiment. While load beam windows have been referenced herein as exemplars, any void in the load beam or other component could be substituted in any embodiment referenced herein. Also, while a spherical indentation has been provided as an example herein for a load point shape, it will be understood that other shapes could alternatively be formed in place of the spherical indentation in any embodiment referenced herein.

Although the present invention has been described with reference to preferred embodiments, those skilled in the art will recognize that changes can be made in form and detail without departing from the spirit and scope of the invention. For example, the various features of the illustrated embodiments can be combined with features of other embodiments. As such, the various embodiments disclosed herein can be modified in view of the features of other embodiments, such as by omitting and/or adding features.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

We claim:

1. A method of forming a first component for a disk drive suspension assembly, comprising:
   forming a metal substrate to include a major planar area having an edge and a flange adjacent to the edge, the flange is truncated at the edge; and
   forming a dimple in the metal substrate adjacent to the flange and adjacent to the edge, the dimple includes an indentation portion, the indentation portion is not truncated and a transition section between the indentation portion and the flange, the transition section is not truncated.

2. The method of claim 1, wherein forming the metal substrate to include the major planar area includes forming the major planar area to include a window defining the edge.

3. The method of claim 1, wherein the metal substrate is a load beam including a rigid region.

4. The method of claim 1, wherein forming the dimple that includes the indentation portion includes forming the indentation portion configured to engage a gimbal region of a flexure.

5. The method of claim 2, wherein a portion of one or both of the indention portion and the transition section project into the window.

6. The method of claim 1, wherein the indention portion is spherical.

7. A method of forming a first component for a disk drive suspension assembly, comprising:
   forming a major planar area having an edge in a metal substrate;
   forming an attachment region configured to attachment to a second component of the disk drive suspension assembly in the metal substrate; and
   forming a flange in the metal substrate adjacent to the edge, the flange is truncated at the edge; and
   forming a dimple in the metal substrate adjacent to the flange and adjacent to the edge, the dimple including an indentation portion that is not truncated and a transition section between the indentation portion and the flange, the transition section is truncated at the edge.

8. The method of claim 7 wherein forming the major planar area having the edge in the metal substrate includes forming the major planar area to include a window defining the edge.

9. The method of claim 8, wherein the metal substrate is a load beam including a rigid region.

10. The method claim 7, wherein forming the dimple that includes the indentation portion includes forming the indentation portion configured to engage a gimbal region of a flexure.

11. The method of claim 8, wherein a portion of one or both of the indention portion and the transition section project into the window.

12. The method of claim 1 wherein the indention portion is spherical.

13. A method of forming a first component for a disk drive suspension assembly, comprising:
   forming a major planar area having an edge in a metal substrate;
   forming an attachment region configured for attachment to a second component of the disk drive suspension assembly in the metal substrate; and
   forming a flange in the metal substrate adjacent to the edge, wherein the flange is truncated at the edge; and
   forming a dimple in the metal substrate at the flange and adjacent to the edge, the dimple including an indentation portion that is truncated at the edge and a transition section between the indentation portion and the flange, the transition section is truncated at the edge.

14. The method of claim 13 wherein forming the major planar area having the edge in the metal substrate includes forming the major planar area to include a window defining the edge.

15. The method of claim 13, wherein the metal substrate is a load beam including a rigid region.

16. The method of claim 13, wherein forming the dimple that includes the indentation portion includes forming the indentation portion configured to engage a gimbal region of a flexure.

17. The method of claim 14, wherein a portion of one or both of the indention portion and the transition section project into the window.

18. The method of claim 17 wherein the indention portion is spherical.

* * * * *